US012627730B2

(12) United States Patent

Levy et al.

(10) Patent No.: US 12,627,730 B2

(45) Date of Patent: May 12, 2026

(54) CLOUD AGNOSTIC, CROSS VIRTUAL PRIVATE CLOUD (VPC) STORAGE CLUSTER DEPLOYMENTS ON CLOUD ENVIRONMENTS

(71) Applicant: Dell Products L.P., Round Rock, TX (US)

(72) Inventors: Shoham Levy, Pardes Hana-Karkur (IL); Michal Davidson, Beit Shemesh (IL)

(73) Assignee: Dell Products L.P., Round Rock, TX (US)

( * ) Notice: Subject to any disclaimer, the term of this patent is extended or adjusted under 35 U.S.C. 154(b) by 101 days.

(21) Appl. No.: 18/902,785

(22) Filed: Sep. 30, 2024

(65) Prior Publication Data

US 2026/0095501 A1 Apr. 2, 2026

(51) Int. Cl.
*G06F 15/16* (2006.01)
*H04L 61/10* (2022.01)
*H04L 67/1008* (2022.01)
*H04L 67/1097* (2022.01)

(52) U.S. Cl.
CPC .......... *H04L 67/1008* (2013.01); *H04L 61/10* (2013.01); *H04L 67/1097* (2013.01)

(58) Field of Classification Search
CPC ..... H04L 67/1008; H04L 67/01; H04L 61/10; H04L 61/09; H04L 9/40; H04L 67/1097

USPC ......................................... 709/203, 201, 217
See application file for complete search history.

(56) References Cited

U.S. PATENT DOCUMENTS

| | | | | | |
|---|---|---|---|---|---|
| 12,355,836 | B2 * | 7/2025 | Khan | .................... | H04L 67/563 |
| 2012/0281708 | A1 * | 11/2012 | Chauhan | .............. | H04L 67/141 |
| | | | | | 370/401 |
| 2021/0303161 | A1 * | 9/2021 | Solan | .................... | G06F 3/0619 |
| 2024/0333716 | A1 * | 10/2024 | Piagentini | ............. | H04L 63/102 |

* cited by examiner

*Primary Examiner* — Kaylee J Huang
(74) *Attorney, Agent, or Firm* — Chamberlain, Hrdlicka, White, Williams & Aughtry; Aly Z. Dossa

(57) ABSTRACT

A method for managing networking among virtual private clouds (VPCs) includes: deploying a storage array to a storage array VPC; analyzing information to determine which networking option needs to be implemented to map each client VPC to the storage array VPC; making, after the analyzing, a first determination that no networking option is already implemented; making, based on the first determination and the information, a second determination that a first networking option needs to be implemented; calling a plugin with a corresponding identifier of a target client and a mapping; identifying the storage array VPC and the target client VPC; defining a multi-VPC ENI that is exposed to the target client VPC using a first client VPC IP address; and initiating notification of a user that networking between the target client VPC and the storage array VPC is established.

20 Claims, 12 Drawing Sheets

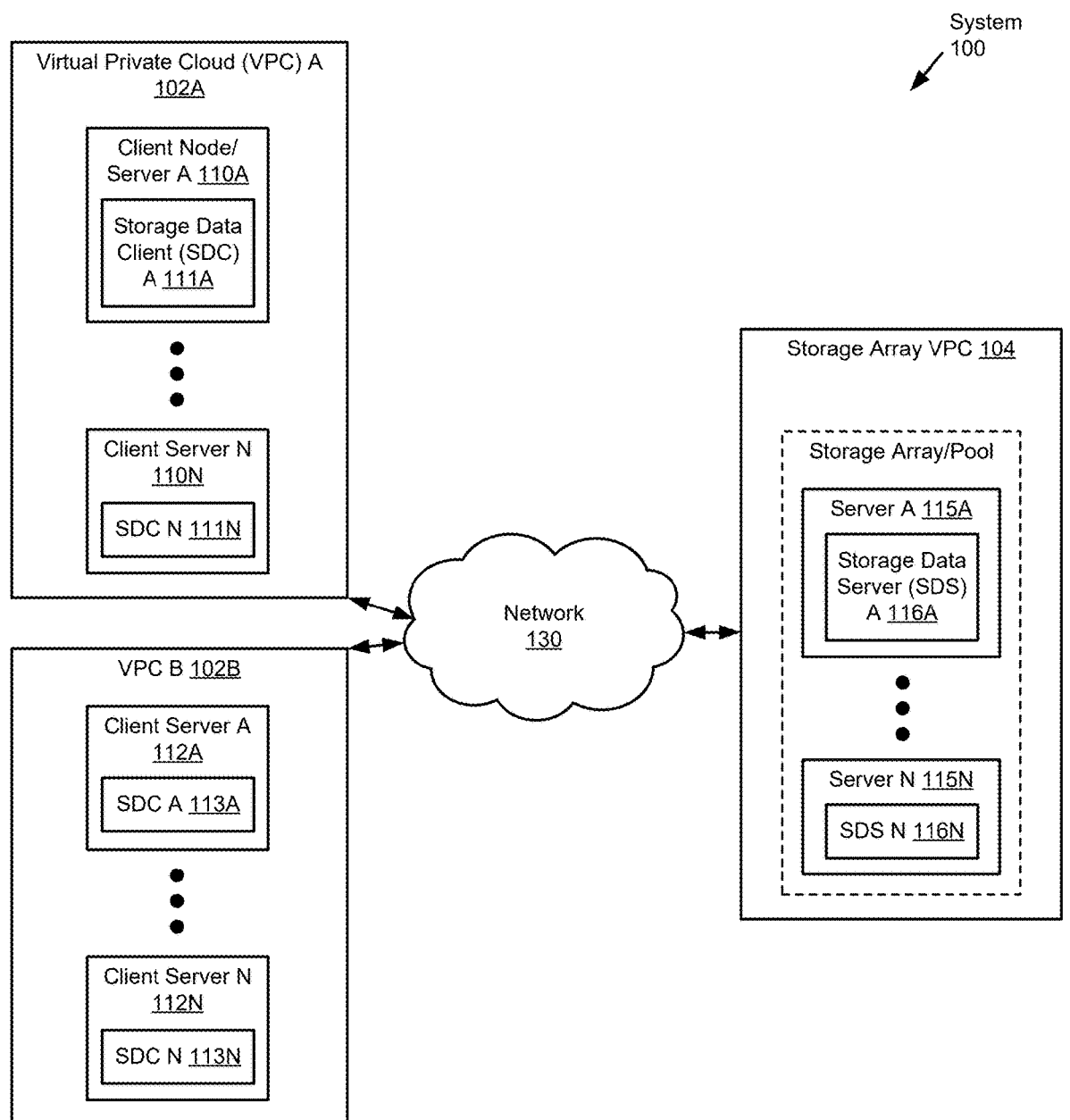
FIG. 1.1

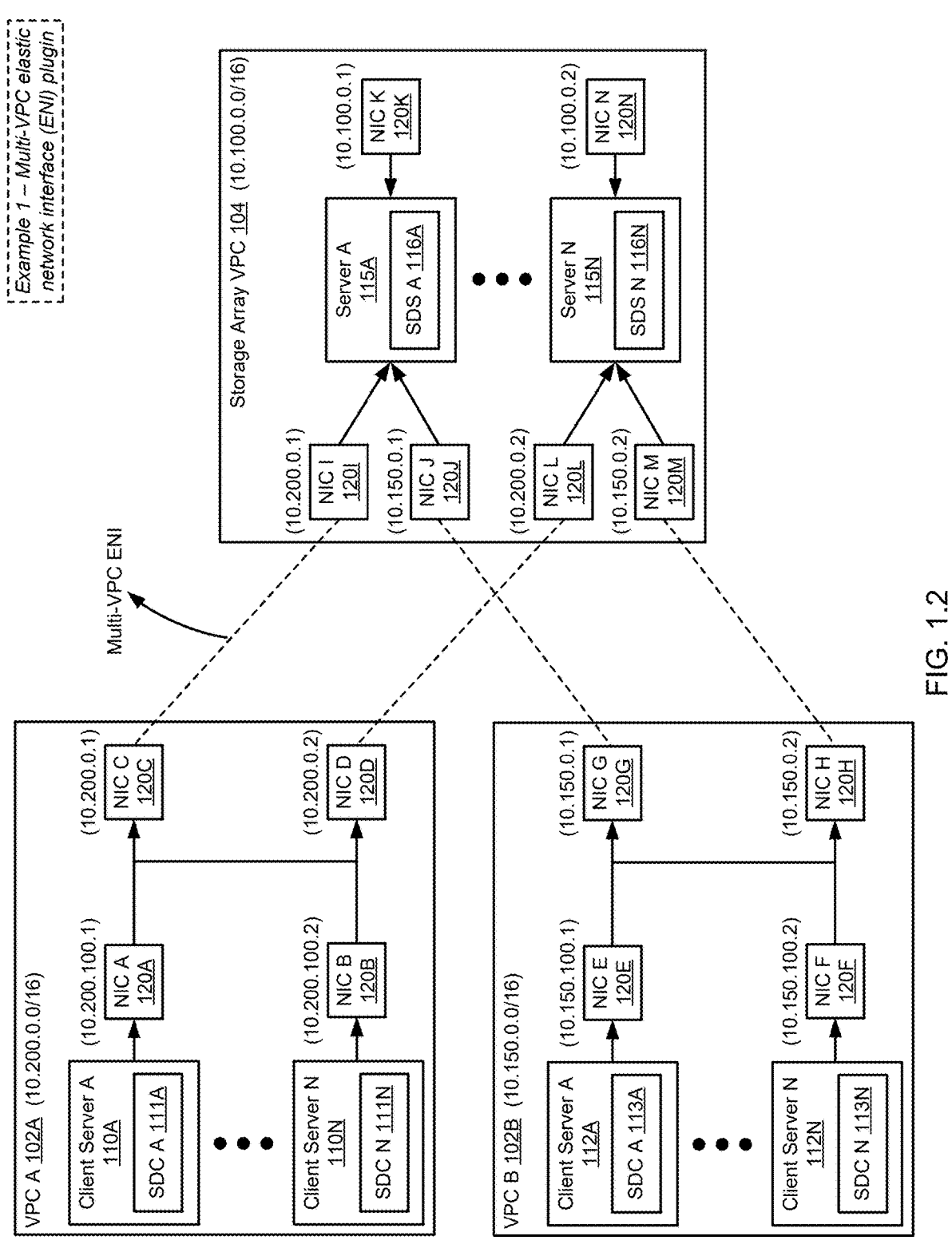
FIG. 1.2

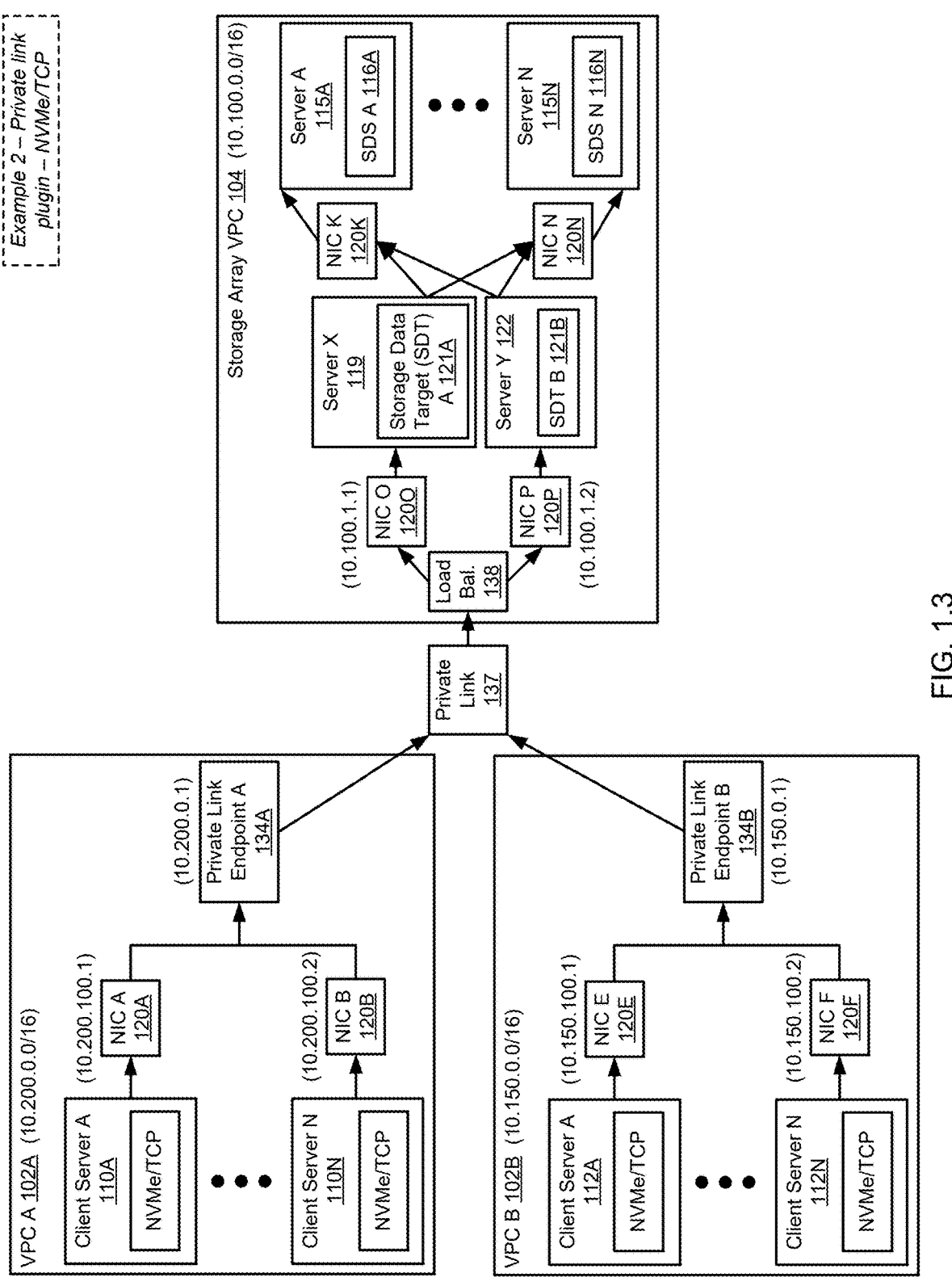
FIG. 1.3

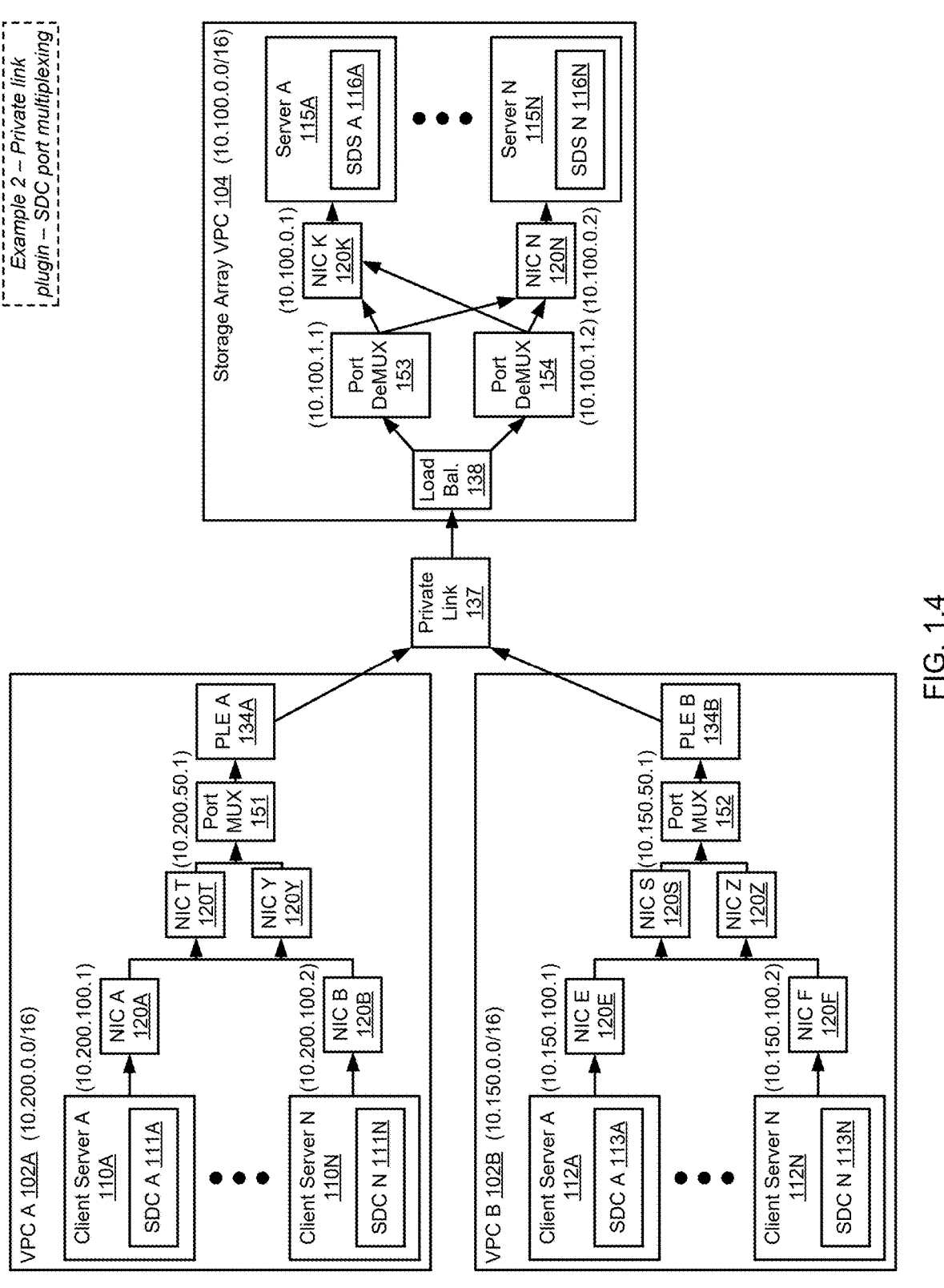
Example 2 – Private link
plugin – SDC port multiplexing
FIG. 1.4

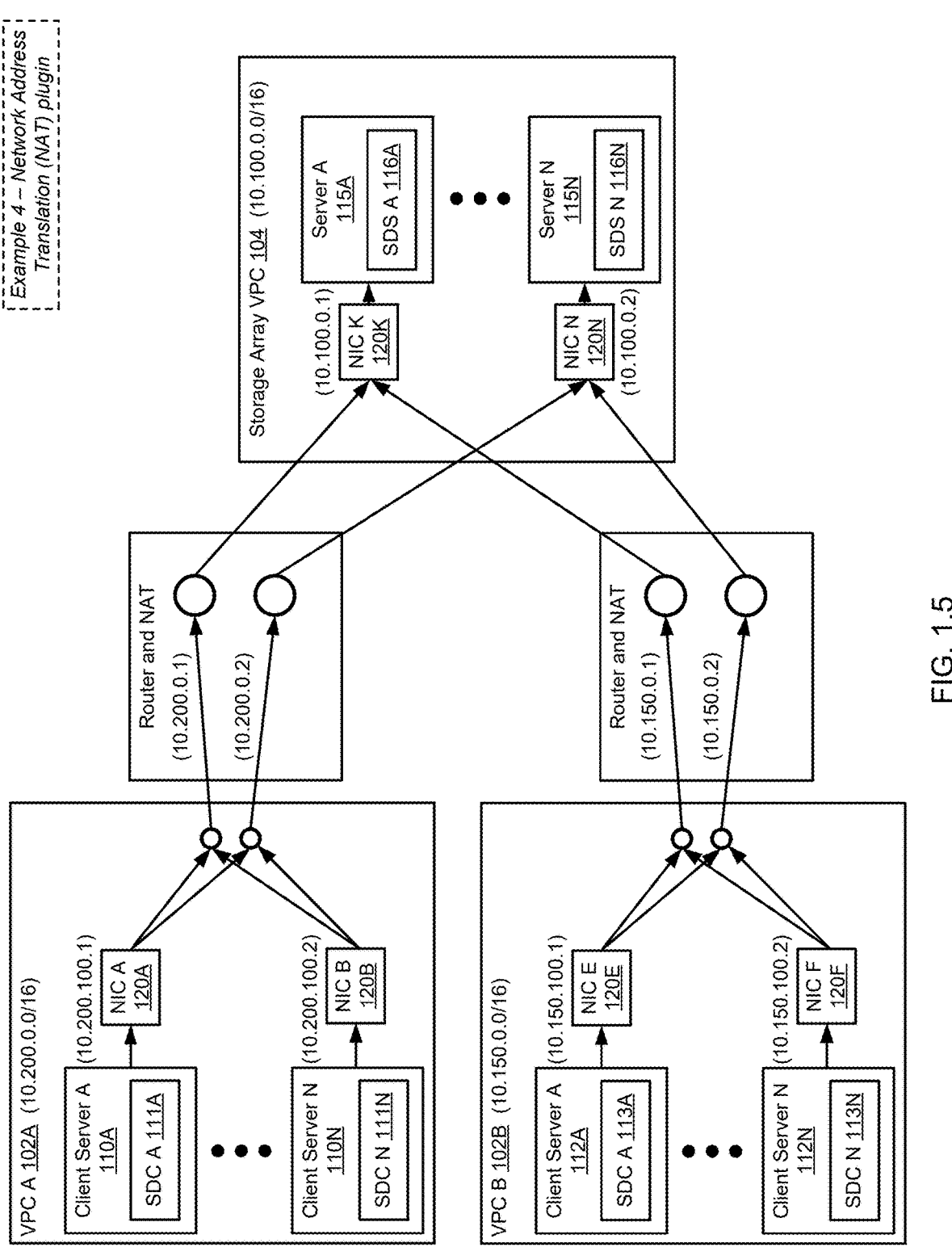
FIG. 1.5

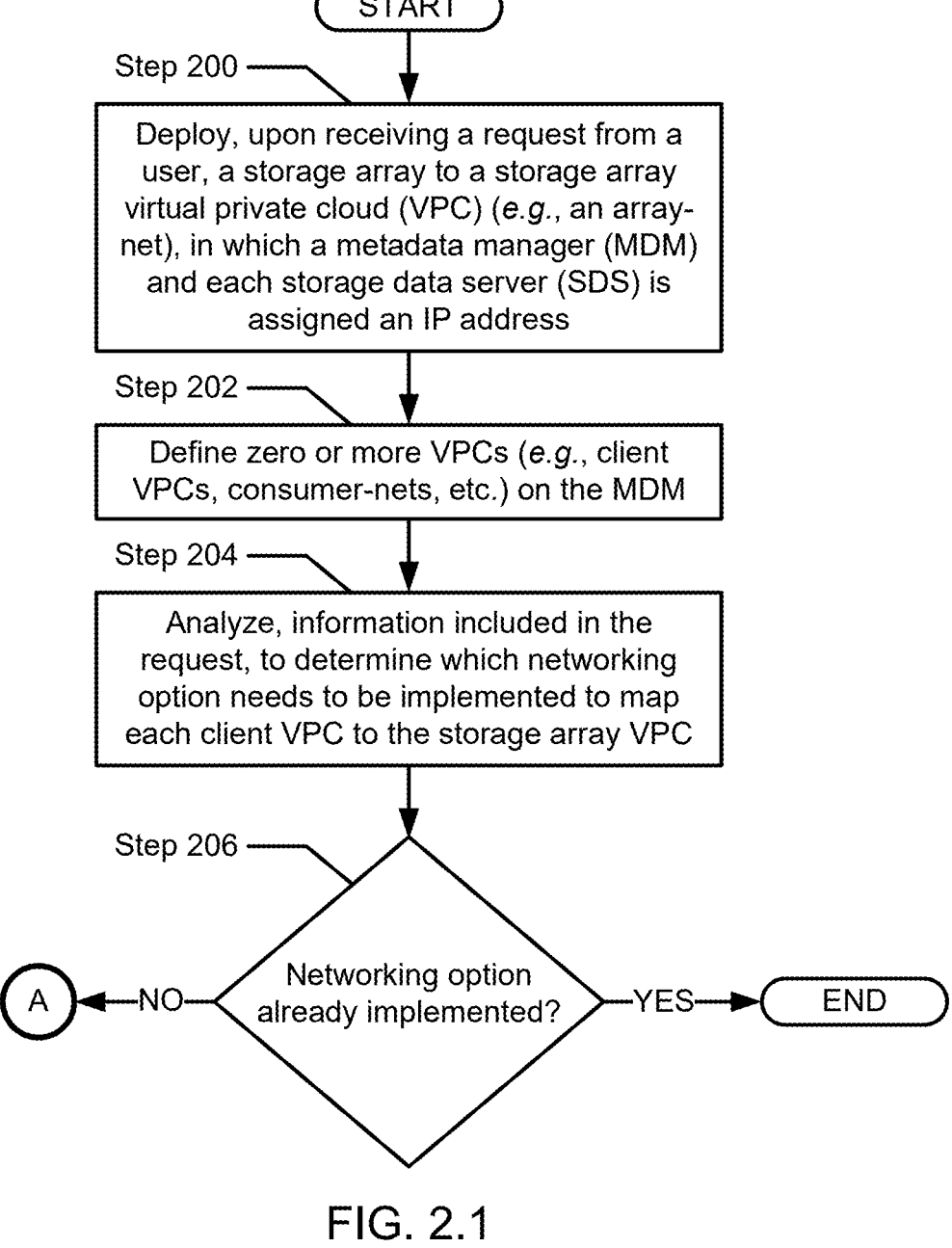
FIG. 2.1

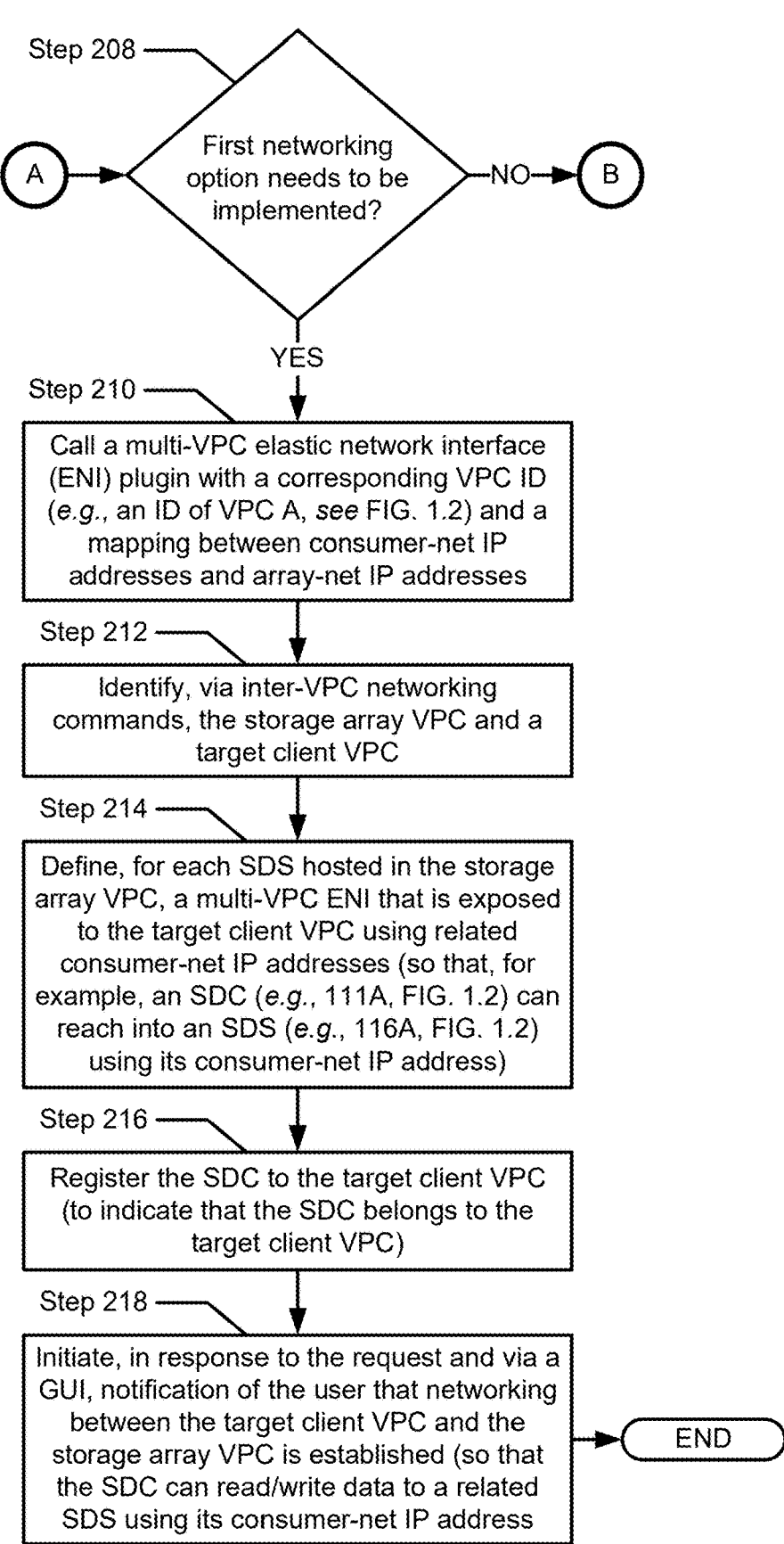
FIG. 2.2

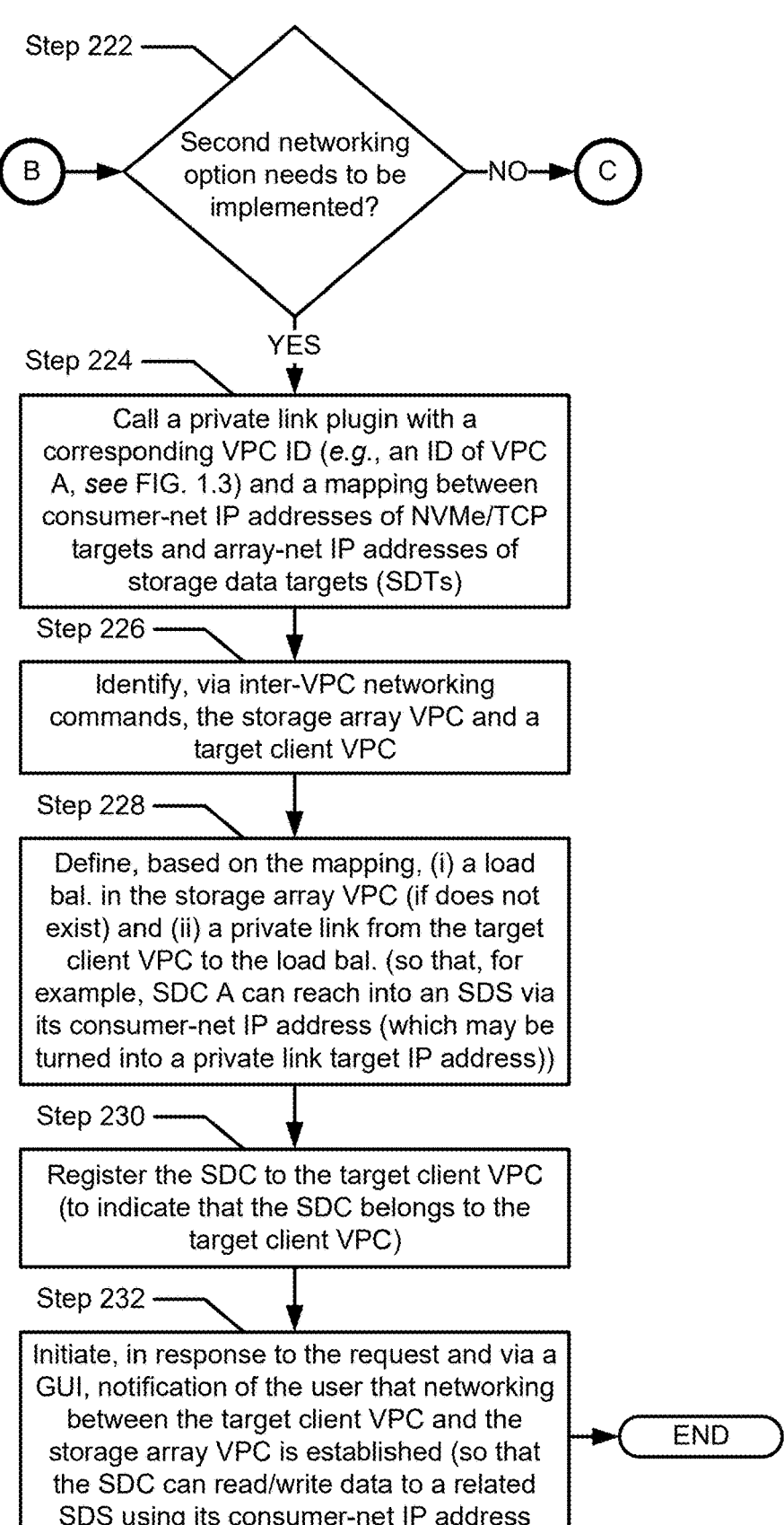

Step 222 —

B →  Second networking option needs to be implemented? —NO→ C

YES

Step 224 —

Call a private link plugin with a corresponding VPC ID (*e.g.*, an ID of VPC A, *see* FIG. 1.3) and a mapping between consumer-net IP addresses of NVMe/TCP targets and array-net IP addresses of storage data targets (SDTs)

Step 226 —

Identify, via inter-VPC networking commands, the storage array VPC and a target client VPC Step 228 —

Define, based on the mapping, (i) a load bal. in the storage array VPC (if does not exist) and (ii) a private link from the target client VPC to the load bal. (so that, for example, SDC A can reach into an SDS via its consumer-net IP address (which may be turned into a private link target IP address))

Step 230 —

Register the SDC to the target client VPC (to indicate that the SDC belongs to the target client VPC)

Step 232 —

Initiate, in response to the request and via a GUI, notification of the user that networking between the target client VPC and the storage array VPC is established (so that the SDC can read/write data to a related SDS using its consumer-net IP address → END

FIG. 2.3

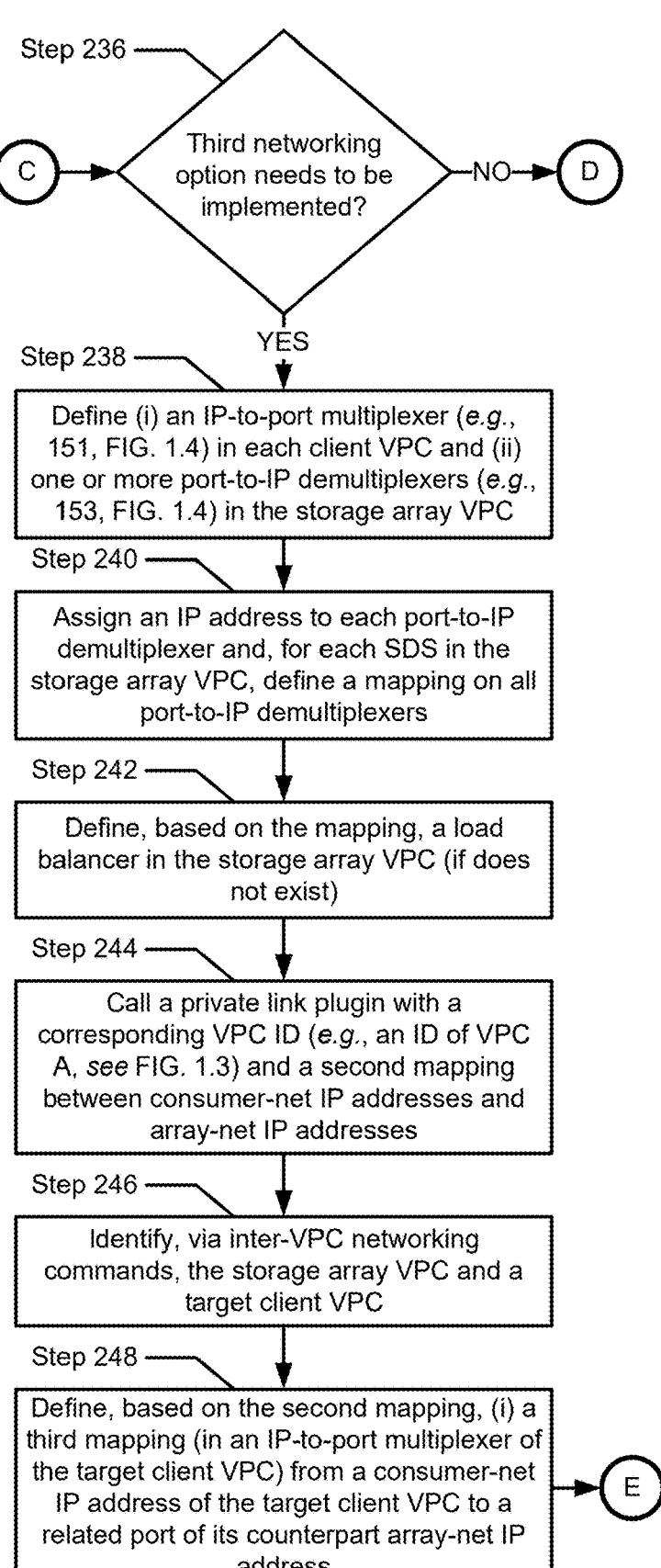

Step 236

C → Third networking option needs to be implemented? —NO→ D

YES

Step 238

Define (i) an IP-to-port multiplexer (*e.g.*, 151, FIG. 1.4) in each client VPC and (ii) one or more port-to-IP demultiplexers (*e.g.*, 153, FIG. 1.4) in the storage array VPC Step 240

Assign an IP address to each port-to-IP demultiplexer and, for each SDS in the storage array VPC, define a mapping on all port-to-IP demultiplexers Step 242

Define, based on the mapping, a load balancer in the storage array VPC (if does not exist)

Step 244

Call a private link plugin with a corresponding VPC ID (*e.g.*, an ID of VPC A, *see* FIG. 1.3) and a second mapping between consumer-net IP addresses and array-net IP addresses Step 246

Identify, via inter-VPC networking commands, the storage array VPC and a target client VPC Step 248

Define, based on the second mapping, (i) a third mapping (in an IP-to-port multiplexer of the target client VPC) from a consumer-net IP address of the target client VPC to a related port of its counterpart array-net IP address → E

FIG. 2.4

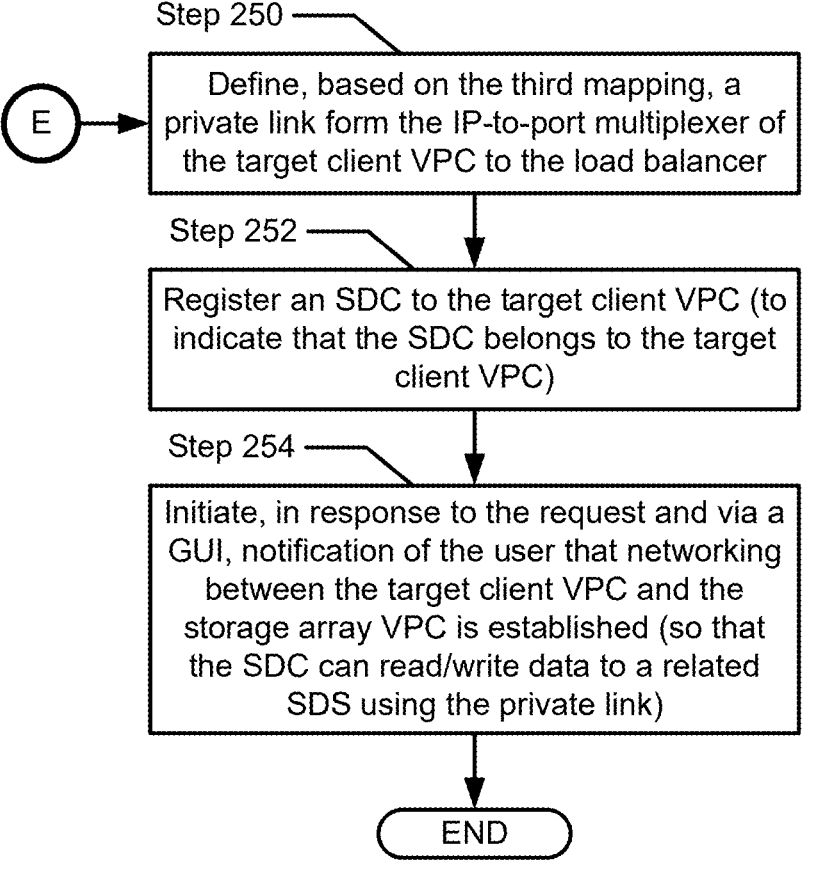

Step 250 ——

Define, based on the third mapping, a private link form the IP-to-port multiplexer of the target client VPC to the load balancer Step 252 ——

Register an SDC to the target client VPC (to indicate that the SDC belongs to the target client VPC)

Step 254 ——

Initiate, in response to the request and via a GUI, notification of the user that networking between the target client VPC and the storage array VPC is established (so that the SDC can read/write data to a related SDS using the private link)

END

FIG. 2.5

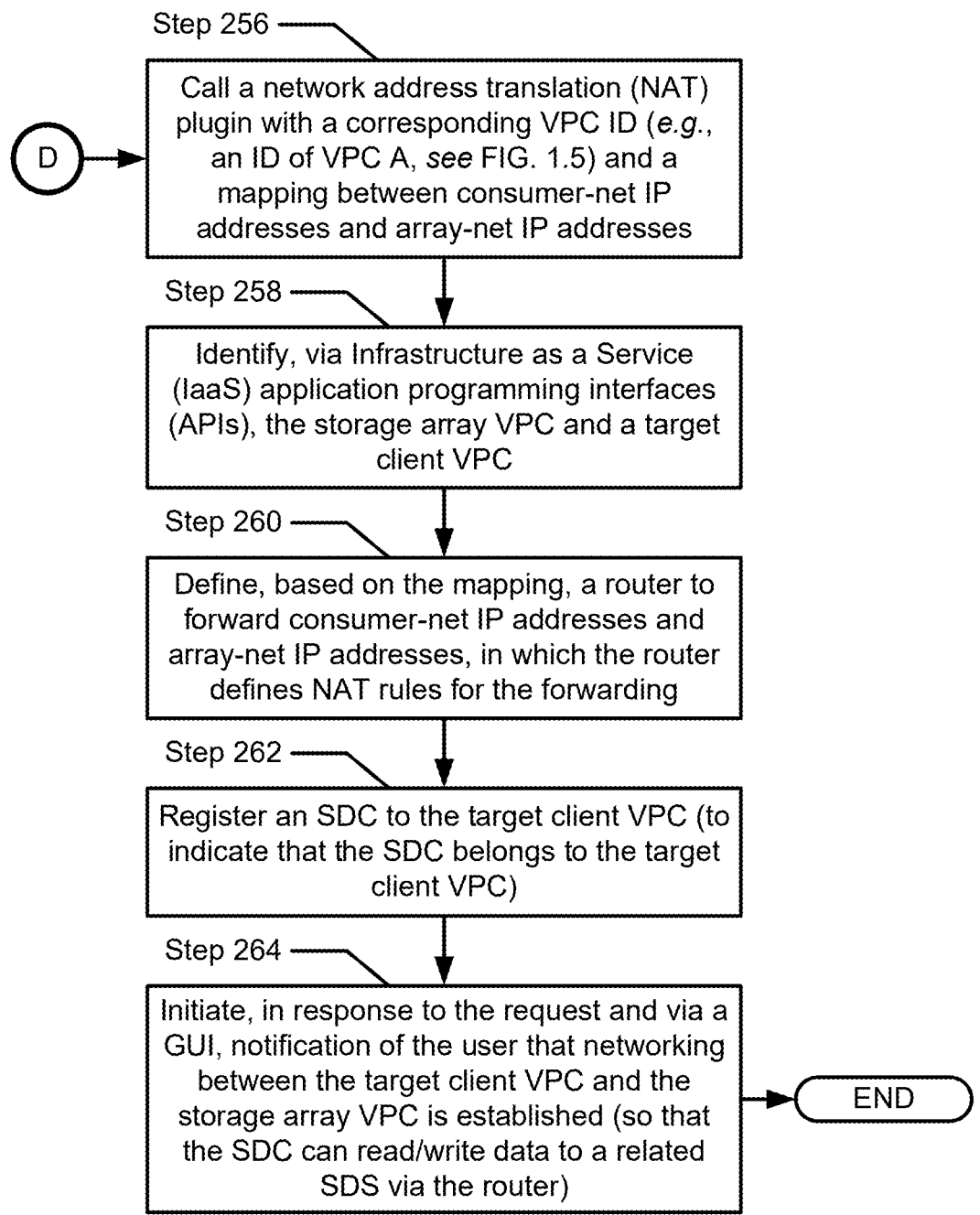

Step 256 ⎯⎯

Call a network address translation (NAT) plugin with a corresponding VPC ID (*e.g.*, an ID of VPC A, *see* FIG. 1.5) and a mapping between consumer-net IP addresses and array-net IP addresses Step 258 ⎯⎯

Identify, via Infrastructure as a Service (IaaS) application programming interfaces (APIs), the storage array VPC and a target client VPC Step 260 ⎯⎯

Define, based on the mapping, a router to forward consumer-net IP addresses and array-net IP addresses, in which the router defines NAT rules for the forwarding Step 262 ⎯⎯

Register an SDC to the target client VPC (to indicate that the SDC belongs to the target client VPC)

Step 264 ⎯⎯

Initiate, in response to the request and via a GUI, notification of the user that networking between the target client VPC and the storage array VPC is established (so that the SDC can read/write data to a related SDS via the router)

END

CLOUD AGNOSTIC, CROSS VIRTUAL PRIVATE CLOUD (VPC) STORAGE CLUSTER DEPLOYMENTS ON CLOUD ENVIRONMENTS

BACKGROUND

Devices are often capable of performing certain functionalities that other devices are not configured to perform, or are not capable of performing. In such scenarios, it may be desirable to adapt one or more systems to enhance the functionalities of devices that cannot perform those functionalities.

BRIEF DESCRIPTION OF DRAWINGS

Certain embodiments disclosed herein will be described with reference to the accompanying drawings. However, the accompanying drawings illustrate only certain aspects or implementations of one or more embodiments disclosed herein by way of example, and are not meant to limit the scope of the claims.

FIG. 1.1 shows a diagram of a system in accordance with one or more embodiments disclosed herein.

FIG. 1.2 shows an example networking established among VPCs using a multi-VPC elastic network interface (ENI) plugin in accordance with one or more embodiments disclosed herein.

FIG. 1.3 shows an example networking established among VPCs using a private link plugin in accordance with one or more embodiments disclosed herein.

FIG. 1.4 shows an example networking established among VPCs using a private link plugin in accordance with one or more embodiments disclosed herein.

FIG. 1.5 shows an example networking established among VPCs using a network address translation (NAT) plugin in accordance with one or more embodiments disclosed herein.

FIGS. 2.1-2.6 show a method for managing networking among VPCs in accordance with one or more embodiments disclosed herein.

DETAILED DESCRIPTION

Figure 3:
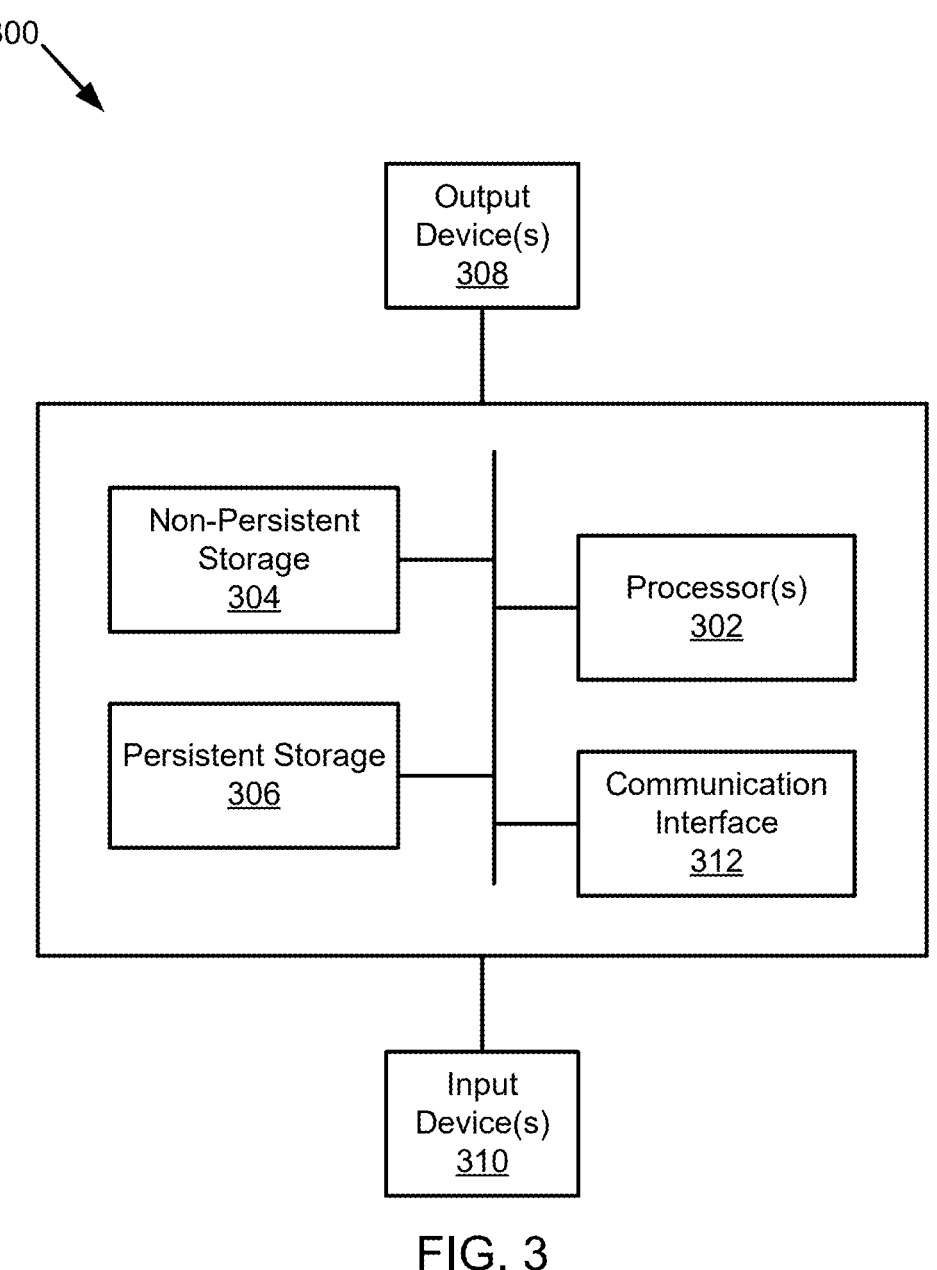
FIG. 3 shows a diagram of a computing device in accordance with one or more embodiments disclosed herein.

Specific embodiments disclosed herein will now be described in detail with reference to the accompanying figures. In the following detailed description of the embodiments disclosed herein, numerous specific details are set forth in order to provide a more thorough understanding of one or more embodiments disclosed herein. However, it will be apparent to one of ordinary skill in the art that the one or more embodiments disclosed herein may be practiced without these specific details. In other instances, well-known features have not been described in detail to avoid unnecessarily complicating the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase "operatively connected" may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, storage area networks (SANs) are confined to Layer 2 networking/layer because of performance considerations, which can be considered enough for small, isolated data centers; however, when a size of a data center grows, implementing Layer 3 routing and NAT become a requirement. An example of such a use case is a public cloud tenant using multiple VPCs, each with its own virtual network, in which the tenant may deploy one or more applications on separate VPCs for legacy, security, and cloning (e.g., of Internet Protocol (IP)) purposes, but the tenant may still want to share the same storage array/pool/cluster.

Using the VPC peering method to define a 1:1 relationship between two VPCs is problematic because defining a 1:1 relationship between VPCs is not scalable for a large amount of storage consumers (e.g., applications), each in a single VPC, which all may need to consume a single central storage cluster.

Further, defining a single network for all VPCs (where each IP address is unique across all VPCs and there are routing rules from each VPC to another VPC) is also problematic because this method breaks network isolation, prevents reuse of IP addresses, and has scalability issues because all IP addresses may need to be unique across all (involved) VPCs. On the other hand, hosting a storage array within a consuming VPC (where storage data client (SDCs)

hosts are executing) is also problematic because this method may allow for simple Layer 2 traffic but may limit the reuse and scale-out benefits of the storage array.

From a different perspective, storage arrays that operate on Layer 2 networking do not inherently support routing and NAT. For example, a software-defined storage system/array may publish all storage data server (SDS) IP addresses to all SDCs, which may cause a corresponding SDC to constantly try and send input/output (I/O) through all SDS addresses (e.g., through all subnets), including subnets that it may not have in its VPC, or even worse, subnets used by other services in its VPC (not reserved for the storage array), thus creating network conflicts. This may also cause inter-VPC connectivity (if used) a repetitive, error prone, and/or manual procedure. Further, this may cause the storage array to constantly warn about broken network connections—as not all SDCs are able to connect to all SDSs through all IP addresses, leading to alert fatigue that reduces the overall serviceability of the storage system.

For at least the reasons discussed above and without requiring resource-intensive efforts (e.g., time, engineering, etc.), a fundamentally different approach/framework is needed (e.g., an approach for storage systems to support a deployment scheme across multiple VPCs on a public (or private) cloud, whereby software-defined storage systems can utilize the available cloud native infrastructure to enable a single storage cluster to be consumed across multiple VPCs (e.g., across Layer 3 networks/layer)).

Embodiments disclosed herein relate to methods and systems, at least, (i) to implement cross-VPC networking (so that a related storage array can be consumed by multiple VPCs) and (ii) enabling the storage array itself to become aware of one or more cloud options (so that the storage array can select the most suitable cloud option (or the optimal networking scheme)). As a result of the processes discussed below, one or more embodiments disclosed herein advantageously ensure that: (i) a storage controller (e.g., a metadata manager (MDM)) that defines and sends a target SDS IP address to a storage initiator (e.g., an SDC), in which the MDM includes different network mappings for each SDC and a plugin (or a plugin system) that enables the MDM to configure a required cloud networking infrastructure (in order to serve a storage cluster/array across VPCs); (ii) different usage/deployments of the plugin is enabled, in which the plugin may be a standalone component or a subcomponent within the MDM; (iii) the framework is cloud-agnostic (said another way, any cloud native or cloud-like networking system may be used to implement the framework); (iv) deploying a storage system/array (e.g., a scale-out storage system) across multiple VPCs provides better utilization of storage capacity (of the array), the ability to easily share substantial amounts of data, and reduced storage management complexity by using a centralized storage cluster across VPCs; (v) inter-VPC network conflicts are hidden from a related storage array and related storage consumers (e.g., an application's host, a container, etc.); (vi) multi-VPC consumption of a related storage array is allowed, while keeping all the benefits of the "single array scale-out"; (vii) in order to select/enable the optimal cross-VPC networking, a wide range of cloud options are presented to a related storage array (based on, at least, user/customer preferences, cloud native constraints, and cost); (viii) many-to-one consumption of a centralized storage system/array by applications spread across multiple VPCs is enabled, without requiring many one-to-one networks peering; and/or (ix) mapping storage volumes to a local VPC and a remote VPC (e.g., a VPC where a related storage array resides) is provided, to enable consumption of the array according to local VPC networking (while being agnostic to networking conflicts between local and remote VPCs).

The following describes various embodiments disclosed herein.

FIG. 1.1 shows a diagram of a system (100) in accordance with one or more embodiments disclosed herein. The system (100) includes any number of VPCs (e.g., VPC A (102A), VPC B (102B), Storage Array VPC (104), etc.), a cross-VPC storage configurator (not shown), and a network (130). The system (100) may include additional, fewer, and/or different components without departing from the scope of the embodiments disclosed herein. Each component may be operably/operatively connected to any of the other components via any combination of wired and/or wireless connections. Each component illustrated in FIG. 1.1 is discussed below.

In one or more embodiments, the VPCs (e.g., 102A, 102B, etc.), the cross-VPC storage configurator, and the network (130) may be (or may include) physical hardware or logical devices, as discussed below. While FIG. 1.1 shows a specific configuration of the system (100), other configurations may be used without departing from the scope of the embodiments disclosed herein. For example, although VPC A (102A) and Storage Array VPC (104) are shown to be operatively connected through a communication network (e.g., 130), VPC A (102A) and Storage Array VPC (104) may be directly connected (e.g., without an intervening communication network).

Further, the functioning of Storage Array VPC (104) may not dependent upon the functioning and/or existence of the other components (e.g., devices) in the system (100). Rather, Storage Array VPC (104) may function independently and perform operations locally that do not require communication with other components. Accordingly, embodiments disclosed herein should not be limited to the configuration of components shown in FIG. 1.1.

As used herein, "communication" may refer to simple data passing, or may refer to two or more components coordinating a job. As used herein, the term "data" is intended to be broad in scope. In this manner, that term embraces, for example (but not limited to): a data stream (or stream data), data chunks, data blocks, atomic data, emails, objects of any type, files of any type (e.g., media files, spreadsheet files, database files, etc.), contacts, directories, sub-directories, volumes, etc.

As used herein, a "VPC" may represent an isolated network, in which virtual machine (VM) instances in one VPC cannot communicate with VMs on another VPC. The same IP addresses may be reused on different VPCs and the convention for, for example, storage subnets may be different between VPCs. In one or more embodiments, VPC may refer to any similar isolated network, with dedicated network interface cards (NICs) and switches.

In one or more embodiments, although terms such as "document", "file", "segment", "block", or "object" may be used by way of example, the principles of the present disclosure are not limited to any particular form of representing and storing data or other information. Rather, such principles are equally applicable to any object capable of representing information.

In one or more embodiments, a VPC (e.g., 102A, 102B, etc.) may refer to a "storage-consumer-subnet" (or, for brevity, "consumer-net"), indicating a subnet (e.g., a range of IP addresses) used to access one or more storage targets (e.g., SDSs) on Storage Array VPC (104). Further, Storage Array VPC (104) may refer to a "storage-array-subnet" (or, for brevity, "array-net"), indicating the original subnet of SDS VPC. In one or more embodiments, the cross-VPC storage configurator (or, for brevity, the "configurator") may be an external component to a storage controller (e.g., an MDM, not shown) or may be a sub-component within the MDM.

In one or more embodiments, the configurator may have a functionality to keep all the mappings between each VPC, for example, (i) which consumer-net (e.g., 102A) is mapped to which array-net (e.g., 104) and (ii) how that consumer-net is mapped to the array-net (by performing IP address translation, if necessary). To this end, one or more subnet mappings may need to be defined (e.g., by the configurator) for related storage controllers and targets, MDMs and SDSs (e.g., 116A, 116N, etc.), respectively.

In one or more embodiments, each VPC (e.g., 102A, 102B, etc.) may be associated with one consumer-net (or with one VPC-consumer-net) as appropriate for a related VPC network. Further, each storage consumer (e.g., each initiator such as SDC A (111A), SDC N (111N), etc.) existing on a client node/server/host (e.g., Client Server A (110A), Client Server N (110N), etc.) may be located within a VPC (e.g., 102A, 102B, etc.) and may be automatically associated by the configurator to a related VPC-consumer-net relevant to the VPC hosting it. Thereafter, a related SDC (e.g., 111A, 111N, etc.) may query the MDM (or more specifically, the controller) via its VPC-consumer-net IP address (e.g., 10.200.100.1 for SDC A (111A), see FIG. 1.2) (in order to, for example, understand which volumes are mapped to itself and to obtain IP addresses of the related SDSs serving these volumes), and not the MDM's IP address in Storage Array VPC (104). The controller may then return to the SDC only the relevant VPC-consumer-net SDS IP addresses (e.g., 10.200.0.1, 10.200.0.2, etc., see FIG. 1.2).

As used herein, a "volume" may be analogous to a logical unit number in a SAN, in which a volume is a subset of a storage pool's capacity presented by an SDC (e.g., 111A, 111N, etc.) as a local block device. A volume's data may be evenly distributed across all storage resources of the storage pool, according to the data layout selected for the storage pool.

In one or more embodiments, a user of a client server (e.g., 110A, 112A, etc.) may need to decide, based on a cloud service provider (CSP), one or more alternatives (e.g., cross-VPC ENIs (see FIG. 1.2), a private link (see FIG. 1.3), etc.) for cross-VPC traffic (e.g., traffic between VPC A (102A) and Storage Array VPC (104)).

Either existing cross-VPC networking may be recognized (and utilized optimally), or the cross-VPC networking may need to be set up for the user, before defining a related data path mapping (e.g., a mapping between SDC A (111A) and SDS A (116A)). To this end, the configurator may call one or more configurator/networking plugins (see FIGS. 1.2-1.5) to setup a newer intra-VPC connectivity, using one or more cloud native cross-VPC mechanisms and to calculate the preferred connection methodology based on a set of user configurable constraints (e.g., user-defined parameters) including, for example (but not limited to): cost (e.g., cost of implementing a networking using a related plugin), scaling limitation (e.g., the number of VPCs that can be implemented/connected), data latency, data throughput, availability of a configurator plugin in a specific geographic location/region, etc.

In one or more embodiments, a default configurator plugin (e.g., a VPC-consumer-net deployment plugin) may be empty and may not configure any newer intra-VPC connections (rather, the plugin may be assumed as previously set up by a related user). In these cases, the configurator may rely on an existing connectivity (e.g., an existing VPC connectivity between VPCs), which may be suitable in cases of brownfield deployments where the user may not wish to set up newer intra-VPC connections.

As used herein, an "ENI" may represent a network interface on a VM, in which a VM may host one or more ENIs. An ENI may bound to a single primary IP version 4 (v4) and/or primary IPv6 address, and potentially an additional IP address (based on the machine type). In one or more embodiments, ENI may refer to any similar network interface on a machine/VM.

As used herein, a "private link" may represent an IP address in a VPC (e.g., a consumer VPC) that redirects to a service provided outside the VPC. For example, in the case of a user-owned-service private link, the private link may redirect to a load balancer on the VPC of the service (e.g., the storage array VPC in this disclosure).

In one or more embodiments, the system (100) may be a distributed system (e.g., a data processing environment) and may deliver at least computing power (e.g., real-time (on the order of milliseconds (ms) or less) network monitoring, server virtualization, etc.), storage capacity (e.g., data backup), and data protection (e.g., software-defined data protection, disaster recovery, etc.) as a service to users of client servers (e.g., 110A, 110N, etc.). For example, the system may be configured to organize unbounded, continuously generated data into a data stream. The system (100) may also represent a comprehensive middleware layer executing on computing devices (e.g., 300, FIG. 3) that supports application and storage environments.

In one or more embodiments, the system (100) may support one or more VM environments, and may map capacity requirements (e.g., computational load, storage access, etc.) of VMs and supported applications to available resources (e.g., processing resources, storage resources, etc.) managed by the environments. Further, the system (100) may be configured for workload placement collaboration and computing resource (e.g., processing, storage/memory, virtualization, networking, etc.) exchange.

To provide computer-implemented services to the users, the system (100) may perform some computations (e.g., data collection, distributed processing of collected data, etc.) locally (e.g., at the users' site using the client servers (e.g., 110A, 110N, etc.)) and other computations remotely (e.g., away from the users' site using the servers (e.g., 115A, 115N, etc.)) from the users. By doing so, the users may utilize different computing devices (e.g., 300, FIG. 3) that have different quantities of computing resources (e.g., processing cycles, memory, storage, etc.) while still being afforded a consistent user experience. For example, by performing some computations remotely, the system (100) (i) may maintain the consistent user experience provided by different computing devices even when the different computing devices possess different quantities of computing resources, and (ii) may process data more efficiently in a distributed manner by avoiding the overhead associated with data distribution and/or command and control via separate connections.

As used herein, "computing" refers to any operations that may be performed by a computer, including (but not limited to): computation, data storage, data retrieval, communications, etc. Further, as used herein, a "computing device" refers to any device in which a computing operation may be carried out. A computing device may be, for example (but not limited to): a compute component, a storage component, a network device, a telecommunications component, etc.

As used herein, a "resource" refers to any program, application, document, file, asset, executable program file, desktop environment, computing environment, or other resource made available to, for example, a user/customer of a client node (described below). The resource may be delivered to the client node via, for example (but not limited to): conventional installation, a method for streaming, a VM executing on a remote computing device, execution from a removable storage device connected to the client node (such as universal serial bus (USB) device), etc.

In one or more embodiments, the client servers (e.g., 110A, 110N, etc.) may be geographically distributed devices (e.g., user devices, front-end devices, etc.) and may have relatively restricted hardware and/or software resources when compared to the servers (e.g., 115A, 115N, etc.).

In one or more embodiments, the client servers (e.g., 110A, 110N, etc.) may be physical or logical computing devices configured for hosting one or more workloads, or for providing a computing environment whereon workloads may be implemented. The client servers may provide computing environments that are configured for, at least: (i) workload placement collaboration, (ii) computing resource (e.g., processing, storage/memory, virtualization, networking, etc.) exchange, and (iii) protecting workloads (including their applications and application data) of any size and scale (based on, for example, one or more service level agreements (SLAs) configured by users of the client servers). The client servers (e.g., 110A, 110N, etc.) may correspond to computing devices that one or more users use to interact with one or more components of the system (100).

In one or more embodiments, a client server (e.g., 110A, 110N, etc.) may include any number of applications (e.g., SDC A (111A), SDC N (111N), etc.) (and/or content accessible through the applications) that provide computer-implemented services to a user. Applications may be designed and configured to perform one or more functions instantiated by a user of the client server. In order to provide application services, each application may host similar or different components. The components may be, for example (but not limited to): instances of databases, instances of email servers, etc. Applications may be executed on one or more client servers as instances of the application.

Applications may vary in different embodiments, but in certain embodiments, applications may be custom developed or commercial (e.g., off-the-shelf) applications that a user desires to execute in a client server (e.g., 110A, 110N, etc.). In one or more embodiments, applications may be logical entities executed using computing resources of a client server. For example, applications may be implemented as computer instructions stored on persistent storage of the client server that when executed by the processor(s) of the client server, cause the client server to provide the functionality of the applications described throughout the application.

In one or more embodiments, while performing, for example, one or more operations requested by a user, applications installed on a client server (e.g., 110A, 110N, etc.) may include functionality to request and use physical and logical resources of the client server. Applications may also include functionality to use data stored in storage/memory resources of the client server. The applications may perform other types of functionalities not listed above without departing from the scope of the embodiments disclosed herein. While providing application services to a user, applications may store data that may be relevant to the user in storage/memory resources of the client server.

In one or more embodiments, to provide services to the users, the client servers (e.g., 110A, 110N, etc.) may utilize, rely on, or otherwise cooperate with one or more servers (e.g., 115A, 115N, etc.). For example, the client servers may issue requests to the servers to receive responses and interact with various components of the servers. The client servers may also request data from and/or send data to the servers (for example, the client servers may transmit information to the servers that allows the servers to perform computations, the results of which are used by the client servers to provide services to the users). As yet another example, the client servers may utilize computer-implemented services provided by the servers. When the client servers interact with the servers, data that is relevant to the client servers may be stored (temporarily or permanently) in the servers.

In one or more embodiments, a client server (e.g., 110A, 110N, etc.) may be capable of, e.g.: (i) collecting users'inputs, (ii) correlating collected users'inputs to the computer-implemented services to be provided to the users, (iii) communicating with a server (e.g., 115A, 115N, etc.) that perform computations necessary to provide the computer-implemented services, (iv) using the computations performed by the server to provide the computer-implemented services in a manner that appears (to the users) to be performed locally to the users, and/or (v) communicating with any virtual desktop (VD) in a virtual desktop infrastructure (VDI) environment (or a virtualized architecture) provided by the server (using any known protocol in the art), for example, to exchange remote desktop traffic or any other regular protocol traffic (so that, once authenticated, users may remotely access independent VDs).

As described above, the client servers (e.g., 110A, 110N, etc.) may provide computer-implemented services to users (and/or other computing devices). The client servers may provide any number and any type of computer-implemented services. To provide computer-implemented services, each client server may include a collection of physical components (e.g., processing resources, storage/memory resources, networking resources, etc.) configured to perform operations of the client server and/or otherwise execute a collection of logical components (e.g., virtualization resources) of the client server.

In one or more embodiments, a processing resource (not shown) may refer to a measurable quantity of a processing-relevant resource type, which can be requested, allocated, and consumed. A processing-relevant resource type may encompass a physical device (i.e., hardware), a logical intelligence (i.e., software), or a combination thereof, which may provide processing or computing functionality and/or services. Examples of a processing-relevant resource type may include (but not limited to): a central processing unit (CPU), a graphics processing unit (GPU), a data processing unit (DPU), a computation acceleration resource, an application-specific integrated circuit (ASIC), a digital signal processor for facilitating high-speed communication, etc.

In one or more embodiments, a storage or memory resource (not shown) may refer to a measurable quantity of a storage/memory-relevant resource type, which can be requested, allocated, and consumed (for example, to store sensor data and provide previously stored data). A storage/memory-relevant resource type may encompass a physical device, a logical intelligence, or a combination thereof, which may provide temporary or permanent data storage functionality and/or services. Examples of a storage/memory-relevant resource type may be (but not limited to):

an HDD, a solid-state drive (SSD), random access memory (RAM), Flash memory, a tape drive, a fibre-channel (FC) based storage device, a floppy disk, a diskette, a compact disc (CD), a digital versatile disc (DVD), a non-volatile memory express (NVMe) device, a NVMe over Fabrics (NVMe-oF) device, resistive RAM (ReRAM), persistent memory (PMEM), virtualized storage, virtualized memory, etc.

In one or more embodiments, while the client servers (e.g., 110A, 110N, etc.) provide computer-implemented services to users, the client servers may store data that may be relevant to the users to the storage/memory resources. When the user-relevant data is stored (temporarily or permanently), the user-relevant data may be subjected to loss, inaccessibility, or other undesirable characteristics based on the operation of the storage/memory resources.

To mitigate, limit, and/or prevent such undesirable characteristics, users of the client servers (e.g., 110A, 110N, etc.) may enter into agreements (e.g., SLAs) with providers (e.g., vendors) of the storage/memory resources. These agreements may limit the potential exposure of user-relevant data to undesirable characteristics. These agreements may, for example, require duplication of the user-relevant data to other locations so that if the storage/memory resources fail, another copy (or other data structure usable to recover the data on the storage/memory resources) of the user-relevant data may be obtained. These agreements may specify other types of activities to be performed with respect to the storage/memory resources without departing from the scope of the embodiments disclosed herein.

In one or more embodiments, a networking resource (not shown) may refer to a measurable quantity of a networking-relevant resource type, which can be requested, allocated, and consumed. A networking-relevant resource type may encompass a physical device, a logical intelligence, or a combination thereof, which may provide network connectivity functionality and/or services. Examples of a networking-relevant resource type may include (but not limited to): a NIC, a network adapter, a network processor, etc.

In one or more embodiments, a networking resource may provide capabilities to interface a client server with external entities (e.g., a server (e.g., 115A)) and to allow for the transmission and receipt of data with those entities. A networking resource may communicate via any suitable form of wired interface (e.g., Ethernet, fiber optic, serial communication etc.) and/or wireless interface, and may utilize one or more protocols (e.g., transport control protocol (TCP), user datagram protocol (UDP), Remote Direct Memory Access, IEEE 801.11, etc.) for the transmission and receipt of data.

In one or more embodiments, a networking resource may implement and/or support the above-mentioned protocols to enable the communication between the client server and the external entities. For example, a networking resource may enable the client server to be operatively connected, via Ethernet, using a TCP protocol to form a "network fabric", and may enable the communication of data between the client server and the external entities. In one or more embodiments, each client server may be given a unique identifier (e.g., an IP address) to be used when utilizing the above-mentioned protocols.

Further, a networking resource, when using a certain protocol or a variant thereof, may support streamlined access to storage/memory media of other client servers (e.g., 110A, 110N, etc.). For example, when utilizing remote direct memory access (RDMA) to access data on another client server, it may not be necessary to interact with the logical components of that client server. Rather, when using RDMA, it may be possible for the networking resource to interact with the physical components of that client server to retrieve and/or transmit data, thereby avoiding any higher level processing by the logical components executing on that client server.

In one or more embodiments, a virtualization resource (not shown) may refer to a measurable quantity of a virtualization-relevant resource type (e.g., a virtual hardware component), which can be requested, allocated, and consumed, as a replacement for a physical hardware component. A virtualization-relevant resource type may encompass a physical device, a logical intelligence, or a combination thereof, which may provide computing abstraction functionality and/or services. Examples of a virtualization-relevant resource type may include (but not limited to): a virtual server, a VM, a container, a virtual CPU (vCPU), a virtual storage pool, etc.

In one or more embodiments, a virtualization resource may include a hypervisor (e.g., a VM monitor), in which the hypervisor may be configured to orchestrate an operation of, for example, a VM by allocating computing resources of a client server (e.g., 110A, 110N, etc.) to the VM. In one or more embodiments, the hypervisor may be a physical device including circuitry. The physical device may be, for example (but not limited to): a field-programmable gate array (FPGA), an application-specific integrated circuit, a programmable processor, a microcontroller, a digital signal processor, etc. The physical device may be adapted to provide the functionality of the hypervisor. Alternatively, in one or more of embodiments, the hypervisor may be implemented as computer instructions stored on storage/memory resources of the client server that when executed by processing resources of the client server, cause the client server to provide the functionality of the hypervisor.

In one or more embodiments, a client server (e.g., 110A, 110N, etc.) may be, for example (but not limited to): a physical computing device, a smartphone, a tablet, a wearable, a gadget, a closed-circuit television (CCTV) camera, a music player, a game controller, etc. Different client servers may have different computational capabilities. In one or more embodiments, Client Server A (110A) may have 16 gigabytes (GB) of dynamic RAM (DRAM) and 1 CPU with 12 cores, whereas Client Server N (110N) may have 8 GB of PMEM and 1 CPU with 16 cores. Other different computational capabilities of the client servers not listed above may also be taken into account without departing from the scope of the embodiments disclosed herein.

Further, in one or more embodiments, a client server (e.g., 110A, 110N, etc.) may be implemented as a computing device (e.g., 300, FIG. 3). The computing device may be, for example, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the client server described throughout the application.

Alternatively, in one or more embodiments, the client server (e.g., 110A, 110N, etc.) may be implemented as a logical device (e.g., a VM, a virtual server, etc.). The logical device may utilize the computing resources of any number of computing devices to provide the functionality of the client server described throughout this application.

In one or more embodiments, users (e.g., customers, administrators, organization executives, etc.) may interact with (or operate) the client servers (e.g., 110A, 110N, etc.) in order to perform work-related tasks (e.g., production workloads). In one or more embodiments, the accessibility of users to the client servers may depend on a regulation set by an administrator of the client servers. To this end, each user may have a personalized user account that may, for example, grant access to certain data, applications (e.g., 111A, 111N, etc.), and computing resources of the client servers. This may be realized by implementing the virtualization technology. In one or more embodiments, an administrator may be a user/person/human with permission (e.g., a user that has root-level access) to make changes on the client servers that will affect other users of the client servers.

In one or more embodiments, for example, a user may be automatically directed to a login screen of a client server when the user connected to that client server. Once the login screen of the client server is displayed, the user may enter credentials (e.g., username, password, etc.) of the user on the login screen. The login screen may be a graphical user interface (GUI) generated by a visualization module (not shown) of the client server. In one or more embodiments, the visualization module may be implemented in hardware (e.g., circuitry), software, or any combination thereof.

In one or more embodiments, a GUI may be displayed on a display of a computing device (e.g., 300, FIG. 3) using functionalities of a display engine (not shown), in which the display engine is operatively connected to the computing device. The display engine may be implemented using hardware (or a hardware component), software (or a software component), or any combination thereof. The login screen may be displayed in any visual format that would allow the user to easily comprehend (e.g., read and parse) the listed information.

In one or more embodiments, a server (e.g., 115A, 115N, etc.) may include (i) a chassis (e.g., a mechanical structure, a rack mountable enclosure, etc.) configured to house one or more servers (or blades) and their components and (ii) any instrumentality or aggregate of instrumentalities operable to compute, classify, process, transmit, receive, retrieve, originate, switch, store, display, manifest, detect, record, reproduce, handle, and/or utilize any form of data for business, management, entertainment, or other purposes.

In one or more embodiments, the server (e.g., 115A, 115N, etc.) may include functionality to, e.g.: (i) obtain (or receive) data (e.g., any type and/or quantity of input) from any source (and, if necessary, aggregate the data); (ii) perform complex analytics and analyze data that is received from one or more client servers (e.g., 110A, 110N, etc.) to generate additional data that is derived from the obtained data without experiencing any middleware and hardware limitations; (iii) provide meaningful information (e.g., a response) back to the corresponding client servers; (iv) filter data (e.g., received from a client server) before pushing the data (and/or the derived data) to a database (not shown) for management of the data and/or for storage of the data (while pushing the data, the server may include information regarding a source of the data (e.g., an identifier of the source) so that such information may be used to associate provided data with one or more of the users (or data owners)); (v) host and maintain various workloads; (vi) provide a computing environment whereon workloads may be implemented (e.g., employing linear, non-linear, and/or machine learning (ML) models to perform cloud-based data processing); (vii) incorporate strategies (e.g., strategies to provide VDI capabilities) for remotely enhancing capabilities of the client servers;

(viii) provide robust security features to the client servers and make sure that a minimum level of service is always provided to a user of a client server; (ix) transmit the result(s) of the computing work performed (e.g., real-time business insights, equipment maintenance predictions, other actionable responses, etc.) to another server (e.g., 115N) for review and/or other human interactions; (x) exchange data with other devices registered in/to the network (130) in order to, for example, participate in a collaborative workload placement (e.g., the node may split up a request (e.g., an operation, a task, an activity, etc.) with another server, coordinating its efforts to complete the request more efficiently than if the server had been responsible for completing the request); (xi) provide software-defined data protection for the client servers (e.g., 110A, 110N, etc.); (xii) provide automated data discovery, protection, management, and recovery operations for the client servers; (xiii) monitor operational states of the client servers; (xiv) regularly back up configuration information of the client servers to the database; (xv) provide (e.g., via a broadcast, multicast, or unicast mechanism) information (e.g., a location identifier, the amount of available resources, etc.) associated with the server to other servers of the system (100); (xvi) configure or control any mechanism that defines when, how, and what data to provide to the client servers and/or database; (xvii) provide data deduplication; (xviii) orchestrate data protection through one or more GUIs; (xix) empower data owners (e.g., users of the client servers) to perform self-service data backup and restore operations from their native applications; (xx) ensure compliance and satisfy different types of service level objectives (SLOs) set by an administrator/user; (xxi) increase resiliency of an organization by enabling rapid recovery or cloud disaster recovery from cyber incidents; (xxii) provide operational simplicity, agility, and flexibility for physical, virtual, and cloud native environments; (xxiii) consolidate multiple data process or protection requests (received from, for example, client servers) so that duplicative operations (which may not be useful for restoration purposes) are not generated; (xxiv) initiate multiple data process or protection operations in parallel (e.g., the server may host multiple operations, in which each of the multiple operations may (a) manage the initiation of a respective operation and (b) operate concurrently to initiate multiple operations); and/or (xxv) manage operations of one or more client servers (e.g., receiving information from the client servers regarding changes in the operation of the client servers) to improve their operations (e.g., improve the quality of data being generated, decrease the computing resources cost of generating data, etc.).

As used herein, a "workload" is a physical or logical component configured to perform certain work functions. Workloads may be instantiated and operated while consuming computing resources allocated thereto. A user may configure a data protection policy for various workload types. Examples of a workload may include (but not limited to): a data protection workload, a VM, a container, a network-attached storage (NAS), a database, an application, a collection of microservices, a file system (FS), small workloads with lower priority workloads (e.g., FS host data, operating system (OS) data, etc.), medium workloads with higher priority (e.g., VM with FS data, network data management protocol (NDMP) data, etc.), large workloads with critical priority (e.g., mission critical application data), etc.

Further, while a single server (e.g., 115A) is considered above, the term "server" includes any collection of systems or sub-systems that individually or jointly execute a set, or multiple sets, of instructions to provide one or more computer-implemented services. For example, a single server may provide a computer-implemented service on its own (i.e., independently) while multiple other servers may provide a second computer-implemented service cooperatively (e.g., each of the multiple other servers may provide similar and or different services that form the cooperatively provided service).

As described above, the server (e.g., 115A) may provide any quantity and any type of computer-implemented services. To provide computer-implemented services, the server may be a heterogeneous set, including a collection of physical components/resources (discussed above) configured to perform operations of the server and/or otherwise execute a collection of logical components/resources (discussed above) of the server.

In one or more embodiments, the server (e.g., 115A) may implement a management model to manage the aforementioned computing resources in a particular manner. The management model may give rise to additional functionalities for the computing resources. For example, the management model may automatically store multiple copies of data in multiple locations when a single write of the data is received. By doing so, a loss of a single copy of the data may not result in a complete loss of the data. Other management models may include, for example, adding additional information to stored data to improve its ability to be recovered, methods of communicating with other devices to improve the likelihood of receiving the communications, etc. Any type and number of management models may be implemented to provide additional functionalities using the computing resources without departing from the scope of the embodiments disclosed herein.

One of ordinary skill will appreciate that the server (e.g., 115A) may perform other functionalities without departing from the scope of the embodiments disclosed herein.

In one or more embodiments, the server (e.g., 115A) may be implemented as a computing device (e.g., 300, FIG. 3). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored in the persistent storage, that when executed by the processor(s) of the computing device cause the computing device to perform the functionality of the server described throughout the application.

Alternatively, in one or more embodiments, similar to a client server (e.g., 110A, 110N, etc.), the server (e.g., 115A) may also be implemented as a logical device.

In one or more embodiments, each server (e.g., 115A, 115N, etc.) may include/host an SDS (e.g., 116A, 116N, etc.) and each client server (e.g., 110A, 110N, etc.) may include/host an SDC (e.g., 111A, 111N, etc.). Referring to FIG. 1.1, the system (100) may represent a collection of entities/components (e.g., hardware components, software components, etc.) managed by the MDM (or the MDM cluster). The system (100) may provide multi-tenant capabilities, at least, via one or more storage arrays/pools (e.g., virtual pools of block storage). In one or more embodiments, storage pools may be used for data separation, tiering, and performance management, and a storage pool may represent a set of physical storage devices (e.g., 115A, 115N, etc.) within a protection domain (e.g., a logical entity that consists of a group of SDSs that provide data protection for each other). Each storage device may belong to one storage pool and a volume may be distributed over all devices residing in the same storage pool.

In one or more embodiments, each volume available to an SDC (e.g., 111A, 111N, etc.) may be distributed across many systems executing an SDS (e.g., 116A, 116N, etc.), and each SDC may have one or more redundant paths to every SDS that services the volume. The MDM (e.g., a highly available storage management cluster) may reside outside of data paths where the MDM may monitor the system's (100) health, coordinate data layouts, and update/rebalance SDCs and/or SDSs if any changes occur. Further, when a volume is generated, the MDM may decide how the volume address space can be distributed across all SDSs supporting the storage pool.

In one or more embodiments, an SDS (e.g., 116A) may represent a software service/application (installed/deployed by a related user to a related server (e.g., 115A) so that the server can be turned into a storage server), running on a server that contributes disks to the storage array. Working together, several SDSs may abstract local storage, maintain storage pools, and present volumes to SDCs (e.g., 111A, 111N, etc.). Further, each SDS may leverage storage resources (e.g., SSDs, storage class memory, spinning disk media, available RAM, etc.) of a corresponding server, and each SDS node (e.g., a server (e.g., 115A)) may be a fault unit, in which the distributed mesh-mirror copies of data may never be placed on the same fault unit.

In one or more embodiments, an SDC (e.g., 111A) may represent a kernel-level driver (installed/deployed by a related user to a related client server (e.g., 110A) so that the client server can be turned into a consumer server) that may provide front-end volume/data access to OSs, applications, and/or hypervisors of the client server. Each SDC may present storage array volumes as logical block devices and each SDC may maintain peer-to-peer connections to each SDS managing the storage pool. Further, each SDC may allow shared volume access for uses such as clustering and each SDC may know which SDS endpoints/servers to contact based on block locations in a related volume.

In one or more embodiments, all, or a portion, of the components of the system (100) may be operably connected each other and/or other entities via any combination of wired and/or wireless connections. For example, the aforementioned components may be operably connected, at least, in part, via the network (130). Further, all, or a portion, of the components of the system (100) may interact with one another using any combination of wired and/or wireless communication protocols.

In one or more embodiments, the network (130) may represent a (decentralized or distributed) computing network and/or fabric configured for computing resource and/or messages exchange among registered computing devices (e.g., the client nodes, the servers, etc.). As discussed above, components of the system (100) may operatively connect to one another through the network (e.g., a SAN, a personal area network (PAN), a LAN, a metropolitan area network (MAN), a WAN, a mobile network, a wireless LAN (WLAN), a virtual private network (VPN), an intranet, the Internet, etc.), which facilitates the communication of signals, data, and/or messages. In one or more embodiments, the network (130) may be implemented using any combination of wired and/or wireless network topologies, and the network may be operably connected to the Internet or other networks. Further, the network (130) may enable interactions between, for example, the client servers (e.g., 110A, 110N, etc.) and the servers (e.g., 115A, 115N, etc.) through any number and type of wired and/or wireless network protocols (e.g., TCP, UDP, IPv4, etc.).

The network (130) may encompass various interconnected, network-enabled subcomponents (not shown) (e.g., switches, routers, gateways, cables etc.) that may facilitate communications between the components of the system (100). In one or more embodiments, the network-enabled subcomponents may be capable of: (i) performing one or more communication schemes (e.g., IP communications, Ethernet communications, etc.), (ii) being configured by one or more components in the network, and (iii) limiting communication(s) on a granular level (e.g., on a per-port level, on a per-sending device level, etc.). The network (130) and its subcomponents may be implemented using hardware, software, or any combination thereof.

In one or more embodiments, before communicating data over the network (130), the data may first be broken into smaller batches (e.g., data packets) so that larger size data can be communicated efficiently. For this reason, the network-enabled subcomponents may break data into data packets. The network-enabled subcomponents may then route each data packet in the network (130) to distribute network traffic uniformly.

In one or more embodiments, the network-enabled subcomponents may decide how real-time (e.g., on the order of ms or less) network traffic and non-real-time network traffic should be managed in the network (130). In one or more embodiments, the real-time network traffic may be high-priority (e.g., urgent, immediate, etc.) network traffic. For this reason, data packets of the real-time network traffic may need to be prioritized in the network (130). The real-time network traffic may include data packets related to, for example (but not limited to): videoconferencing, web browsing, voice over Internet Protocol (VoIP), etc.

Referring to FIG. 1.1, (i) Storage Array VPC (104) may be a part of a first business operation region (BOR) and may execute on a first geographic location in the world, (ii) VPC A (102A) (e.g., a first client VPC) may be a part of a second BOR and may execute on a second geographic location in the world, and (iii) VPC B (102B) (e.g., a second client VPC) may be a part of a third BOR and may execute on a third geographic location in the world, in which the first geographic location, second geographic location, and third geographic location may be distinct locations.

As described below (referring to FIGS. 1.2-2.6), a user may not need to concern about multiple VPCs that use the same IP address ranges because those IP address ranges are internal to each VPC. Further, one or more embodiments illustrate (i) various ways to implement cross-VPC networking/connectivity so that Storage Array (hosted by Storage Array VPC (104)) can be consumed by multiple client servers (e.g., 110A, 110N, etc.) and (ii) enabling Storage Array to become aware of one or more cloud options so that Storage Array can select the most suitable cloud option (or the optimal networking scheme) to automatically communicate with client servers).

In one or more embodiments, a data path(s) enabled/provided by the system (100) may be agnostic to the consumer-subnet's (e.g., 102A, 102B, etc.) topology and may expect the same behavior on all clouds. As discussed throughout this application, the system (100) enables utilizing the configurator with VPC awareness, which may provide consumer-subnet IP addresses to SDCs (e.g., 111A, 113A, etc.), (i) to enable using a variety of cloud native cross-VPC routing services (see FIGS. 1.2-1.5), (ii) to dynamically select the preferred cross-VPC routing methodology (see e.g., Step 208 of FIG. 2.2), and (iii) to properly route read/write and MDM calls to the correct entity (e.g., SDS, MDM, etc.). This routing scheme may utilize one or more cloud-specific plugins (see FIGS. 1.2-1.5) (where each plugin (managed by the configurator) may implement a different routing methodology) to be generated on different cloud platforms (and even on a single cloud platform, by building in a different way). With this way, the storage controller (e.g., the MDM) may remain cloud agnostic and, in particular, VPC agnostic.

In one or more embodiments, the collection of cloud-specific intra-VPC plugins (or the cloud-specific plugins) may support both utilizing existing cross-VPC connections in brownfield systems and calling cloud-specific plugins for cloud-specific cross-VPC networking in greenfield systems (see Step 206 in FIG. 2.1).

In one or more embodiments, the configurator may employ cross-VPC routing logic. To this end, the configurator may perform mapping of volumes (or storage volumes) to both local VPC (e.g., a VPC that is local to a related SDC such as VPC A for SDC A) and remote VPC (e.g., a VPC that is remote to a related SDC such as Storage Array VPC to SDC A), to enable consumption of storage (provided by Storage Array) according to local VPC networking.

Further, the configurator may expose an application programming interface (API) for storage consumers (e.g., 110A, 112A, etc.), used by applications (e.g., 111A, 113A, etc.) to consume storage provided by Storage Array, to at least support configuring a related host (or a related client server) to be VPC aware, i.e., to have internal knowledge of its own consumer-net thus allowing the host to identify a collection of storage server/node (e.g., 115A, 115N, etc.) IP addresses per protection domain. To this end, (i) for each VPC, the configurator may map IP addresses of the (local) consumer-net to IP addresses of the array-net, (ii) for each VPC, the configurator may define an IP translation rule(s) from each local consumer-net IP address to its respective array-net IP address (e.g., using cloud native support for the IP translation across VPCs, such as a multi VPC ENI, VPC endpoints, etc.), (iii) for each application (e.g., an SDC) host (e.g., 110A, 112A, etc.), the configurator may associate the application with its respective VPC and consumer-net, (iv) when the configurator sends storage IP address mappings to a related storage consumer (e.g., an SDC), the configurator may receive a call from the SDC to return the relevant consumer-net addresses (and not the array-net IP addresses) and then may return those to the SDC, and/or (v) when a related storage consumer calls Storage Array, the storage consumer may use the only set of IP addresses storage consumer knows from the consumer-net (which are the IP addresses received in (iv)).

In one or more embodiments, the system (100) may support both customer-configured existing cross-VPC network setups and perform the cross-VPC networking using a cloud-specific plugin. To this end, in one or more embodiments, a cloud-specific plugin to be used for generating a newer cross-VPC network may be specified as a cloud-specific-cross-VPC-plugin. Further, in cases where cross-VPC networking is requested (see e.g., Step 200 of FIG. 2.1), the configurator (called by the storage controller) may retrieve the relevant consumer-net information from the storage controller and may optionally apply the information on the current cloud platform (if cross-VPC networking was not configured by a related user/the customer).

In one or more embodiments, to establish a cross-VPC connectivity (see FIGS. 1.2-1.5), the configurator may call one or more cloud-specific-cross-VPC-plugins (e.g., a multi-VPC ENI plugin, a private link plugin—NVMe/TCP (or NVMe over TCP), a private link plugin—SDC port multi-plexing, NAT plugin, etc.), in which the plugins may call other system components to configure the cross-VPC connectivity (or the cross-VPC networking). For example, a cloud-specific-cross-VPC-plugin may call a navigator to communicate with public-cloud networking APIs.

In one or more embodiments, each plugin may have a functionality to, e.g.: (i) query (a) the cost of requested connectivity and (b) performance metrics such as latency, throughput, maximum SDS instances that can be supported (within the Storage Array), etc., (ii) identify an existing connectivity (e.g., identifying a state of an existing plugin, probing an existing cloud environment, etc.), and/or (iii) set up a suitable inter-VPC connectivity.

In one or more embodiments, the configurator may call a cloud-specific-cross-VPC-plugin with the following inputs (which are already known by the storage controller (i.e., the MDM)): (i) an identifier of Storage Array VPC (104) (as defined by Storage Array) and/or (ii) Storage Array VPC's mapping between consumer-net IP addresses and array-net IP addresses. Further, each plugin may be stateful, keeping credentials and existing constructs—such as connected VPCs, already existing private links, etc. With this way, the configurator may not need to pertain infrastructure/cloud specific information.

In one or more embodiments, (i) to query plugin-specific cost and performance and (ii) to compare different networking solutions, the configurator may call each plugin's query function with a relevant input of IP address mappings and may get back the cost and various performance metrics (e.g., cost of implementing a networking option using a related plugin, a number of VPCs (and/or SDSs) that the networking option supports, data latency performance of the networking option, data throughput performance of the networking option, availability of the networking option in a related user's geographic location, etc.).

Further, each plugin may locate one or more already existing inter-VPC network components that can be reused, thus lowering the cost of establishing a related cross-VPC networking. Each plugin may even optimize cloud native resources between multiple VPCs. The configurator may then prioritize/select/use a related plugin (see FIGS. 2.2-2.4) according to user-defined parameters.

In one or more embodiments, in order to interact with the configurator (e.g., while defining/installing one or more consumer-nets), a user may use the following commands (e.g., via his/her computing device), e.g.: (i) define consumer-nets, automatically or manually, by mapping each SDS array-net IP address to an IP address on each consumer-net, (ii) map a VPC to a consumer-net, (iii) associate an SDC (e.g., 111A, 111N, etc.) with a VPC, (iv) perform a networking configuration: (a) request the creation of a consumer-net for the associated VPC (thus creating a consumer-net per VPC), by using internal logic to calculate the preferred intra-VPC connection type (enabled by a related plugin), based on user-defined parameters/constraints and (b) call the plugin.

One of ordinary skill will appreciate that the configurator may perform other functionalities without departing from the scope of the embodiments disclosed herein. The configurator may be implemented using hardware (e.g., any number of integrated circuits for processing computer readable instructions), software (e.g., a computer program), or any combination thereof.

While FIG. 1.1 shows a configuration of components, other system configurations may be used without departing from the scope of the embodiments disclosed herein.

FIG. 1.2-1.5 illustrate details of different plugins to perform different cross-VPC networking implementations in accordance with one or more embodiments disclosed herein.

Turning now to FIG. 1.2, FIG. 1.2 shows an example cross-VPC networking established among VPCs using a multi-VPC ENI plugin in accordance with one or more embodiments disclosed herein. As discussed below, in this example, the multi-VPC ENI plugin is a way for the MDM (or more specifically, for the configurator) to set up the cross-VPC networking among VPC A (102A) and VPC B (102B) to Storage Array VPC (104).

Referring to FIG. 1.2 (indicating, at least, how to map VPC A (102A) and VPC B (102B) to Storage Array VPC (104)) and with respect to VPC A (102A), (i) VPC A (102A) uses (or is associated with) "10.200.0.0/16" consumer-net (e.g., a range of IP addresses for a storage network) (which may be defined by a related user on the MDM), (ii) SDC A's (111A) IP address is "10.200.100.1" (where SDC A may write to (and/or read from) an IP address ("10.200.0.1" and/or "10.200.0.2") by considering/targeting that a related SDS (e.g., 116A) resides on that IP address (in fact SDS A (116A) resides on IP address "10.100.0.1", and "10.100.0.1" is meaningless to SDC A (111A) because "10.100.0.1" is an IP address in a different subnet), and/or (iii) SDC N's (111N) IP address is "10.200.100.2" (where SDC N may write to (and/or read from) an IP address ("10.200.0.1" and/or "10.200.0.2") by considering/targeting that a related SDS (e.g., 116N) resides on that IP address (in fact SDS N (116N) resides on IP address "10.100.0.2", and "10.100.0.2" is meaningless to SDC N (111N) because "10.100.0.2" is an IP address in a different subnet).

Referring to FIG. 1.2 and with respect to VPC B (102B), (i) VPC B (102B) uses (or is associated with) "10.150.0.0/16" consumer-net (e.g., a range of IP addresses for a storage network) (which may be defined by a related user on the MDM), (ii) SDC A's (113A) IP address is "10.150.100.1" (where SDC A may write to (and/or read from) an IP address ("10.150.0.1" and/or "10.150.0.2") by considering/targeting that a related SDS (e.g., 116A) resides on that IP address (in fact SDS A (116A) resides on IP address "10.100.0.1", and "10.100.0.1" is meaningless to SDC A (113A) because "10.100.0.1" is an IP address in a different subnet), and/or (iii) SDC N's (113N) IP address is "10.150.100.2" (where SDC N may write to (and/or read from) an IP address ("10.150.0.1" and/or "10.150.0.2") by considering/targeting that a related SDS (e.g., 116N) resides on that IP address (in fact SDS N (116N) resides on IP address "10.100.0.2", and "10.100.0.2" is meaningless to SDC N (113N) because "10.100.0.2" is an IP address in a different subnet).

Further, referring to FIG. 1.2, each IP address may be illustrated with a related NIC. For example, IP address "10.200.100.1" may be represented by NIC A (120A) and IP address "10.150.100.2" may be represented by NIC F (120F).

In one or more embodiments, by choosing/implementing the multi-VPC ENI plugin (which is a cloud-specific cross-VPC-plugin or routing service to dictate, for example, (a) take IP address "10.100.0.1" and expose that IP address on VPC A (102A) as "10.200.0.1", (b) take IP address "10.100.0.1" and expose that IP address on VPC B (102B) as "10.150.0.1", etc.), the configurator may establish one or more data paths (which are agnostic to VPC A's and VPC B's topologies) (i) from VPC A (102A) to Storage Array VPC (104) and (ii) from VPC B (102B) to Storage Array VPC (104) to properly route read/write and MDM calls to the correct entity (e.g., SDS A (116A), SDS N (116N), etc.) in Storage Array VPC (104). As indicated, the multi-VPC ENI plugin enabled communication/networking between, for example, VPC A (102A) and Storage Array VPC (104) may be a unidirectional communication. Said another way, for example, SDS A (116A) may not call (or make a call to) SDC A (111A) using the related IP addresses (e.g., 10.200.0.1) (SDS A may only accept/reply a received call/request); however, SDC A (111A) may call (or make a call to) SDS A (116A) using the related IP addresses (e.g., 10.200.0.1).

Turning now to FIG. 1.3, FIG. 1.3 shows an example "cross-VPC" networking established among VPCs using a private link plugin—NVMe/TCP in accordance with one or more embodiments disclosed herein. As discussed below, in this example, the private link plugin—NVMe/TCP is a way for the MDM (or more specifically, for the configurator) to set up the cross-VPC networking among VPC A (102A) and VPC B (102B) to Storage Array VPC (104).

Referring to FIG. 1.3 (indicating, at least, how to map VPC A (102A) and VPC B (102B) to Storage Array VPC (104)) and with respect to VPC A (102A), (i) VPC A (102A) uses (or is associated with) "10.200.0.0/16" consumer-net (which may be defined by a related user on the MDM), (ii) Client Server A's (110A) IP address is "10.200.100.1" (where Client Server A may write to (and/or read from) an IP address "10.200.0.1" by considering/targeting that a related SDS (e.g., 116A) resides on that IP address (in fact SDS A (116A) resides on IP address "10.100.0.1", and "10.100.0.1" is meaningless to Client Server A (110A) because "10.100.0.1" is an IP address in a different subnet), (ii) Client Server N's (110N) IP address is "10.200.100.2" (where Client Server N may write to (and/or read from) an IP address "10.200.0.1" by considering/targeting that a related SDS (e.g., 116N) resides on that IP address (in fact SDS N (116N) resides on IP address "10.100.0.2", and "10.100.0.2" is meaningless to Client Server N (110N) because "10.100.0.2" is an IP address in a different subnet); (iii) Storage Array in Storage Array VPC (104) supports NVMe/TCP over a single private link (137) (via Storage Data Target (SDT) A (121A) and SDT B (121B), in which each SDT is an intermediate service representing the entire volumes of Storage Array to VPC A (102A) via the private link (137)) to enable, for example, read/write calls from Client Server A (110A) to SDS A (116) and SDS (116N) over the private link (137); (iv) the private link (137) operates by exposing a single IP address "10.200.0.1" to, for example, VPC A (102A) and sends all the traffic (received from VPC A (102A)) to a load balancer (138) (in Storage Array VPC (104)); and/or (v), for example, when Client Server A (110A) writes to IP address "10.200.0.1", this write traffic forwarded (via the private link (137)) to the load balancer (138), and then by applying Round Robin method, the load balancer (138) may send the traffic to IP address "10.100.1.1", which is indeed SDT A (121A) exposing Volume X and Volume Y of Storage Array (in Storage Array VPC (104)).

Referring to FIG. 1.3 and with respect to VPC B (102B), (i) VPC B (102B) uses (or is associated with) "10.150.0.0/16" consumer-net (which may be defined by a related user on the MDM), (ii) Client Server A's (112A) IP address is "10.150.100.1" (where Client Server A may write to (and/or read from) an IP address "10.150.0.1" by considering/targeting that a related SDS (e.g., 116N) resides on that IP address (in fact SDS N (116N) resides on IP address "10.100.0.2", and "10.100.0.2" is meaningless to Client Server A (112A) because "10.100.0.2" is an IP address in a different subnet), (ii) Client Server N's (112N) IP address is "10.150.100.2" (where Client Server N may write to (and/or read from) an IP address "10.150.0.1" by considering/targeting that a related SDS (e.g., 116N) resides on that IP address (in fact SDS N (116N) resides on IP address "10.100.0.2", and "10.100.0.2" is meaningless to Client Server N (112N) because "10.100.0.2" is an IP address in a different subnet); (iii) Storage Array in Storage Array VPC (104) supports NVMe/TCP over the private link (137) (via SDT A (121A) and SDT B (121B), in which each SDT is an intermediate service representing the entire volumes of Storage Array to VPC B (102B) via the private link (137)) to enable, for example, read/write calls from Client Server A (112A) to SDS A (116) and SDS (116N) over the private link (137); (iv) the private link (137) operates by exposing a single IP address "10.150.0.1" to VPC B (102B) and sends all the traffic (received from VPC B (102B)) to the load balancer (138); and/or (v), for example, when Client Server A (112A) writes to IP address "10.150.0.1", this write traffic forwarded (via the private link (137)) to the load balancer (138), and then by applying Round Robin method, the load balancer (138) may send the traffic to IP address "10.100.1.2", which is indeed SDT B (121B) exposing Volume T and Volume C of Storage Array (in Storage Array VPC (104)).

Further, referring to FIG. 1.3, each IP address may be illustrated with a related NIC. For example, IP address "10.100.1.1" may be represented by NIC O (120O) and IP address "10.150.100.2" may be represented by NIC F (120F).

In one or more embodiments, by choosing/implementing the private link plugin—NVMe/TCP (which is a cloud-specific cross-VPC-plugin or routing service to dictate, for example, (a) take IP address "10.100.0.1" and expose that IP address on VPC A (102A) as "10.200.0.1", (b) take IP address "10.100.0.1" and expose that IP address on VPC B (102B) as "10.150.0.1", etc.), the configurator may establish one or more data paths (which are agnostic to VPC A's and VPC B's topologies) (i) from VPC A (102A) to Storage Array VPC (104) and (ii) from VPC B (102B) to Storage Array VPC (104) to properly route read/write and MDM calls to the correct entity (e.g., SDS A (116A), SDS N (116N), etc.) in Storage Array VPC (104). As indicated, the private link plugin—NVMe/TCP enabled communication/networking between, for example, VPC A (102A) and Storage Array VPC (104) may be a unidirectional communication.

Turning now to FIG. 1.4, FIG. 1.4 shows an example "cross-VPC" networking established among VPCs using a private link plugin—SDC port multiplexing in accordance with one or more embodiments disclosed herein. As discussed below, in this example, the private link plugin—SDC port multiplexing is a way for the MDM (or more specifically, for the configurator) to set up the cross-VPC networking among VPC A (102A) and VPC B (102B) to Storage Array VPC (104).

Referring to FIG. 1.4 (indicating, at least, how to map VPC A (102A) and VPC B (102B) to Storage Array VPC (104)) and with respect to VPC A (102A), (i) VPC A (102A) uses (or is associated with) "10.200.0.0/16" consumer-net (which may be defined by a related user on the MDM), (ii) SDC A's (111A) IP address is "10.200.100.1" (where SDC A may write to (and/or read from) an IP address "10.200.0.1" by considering/targeting that a related SDS (e.g., 116A) resides on that IP address (in fact SDS A (116A) resides on IP address "10.100.0.1", and "10.100.0.1" is meaningless to SDC A (110A) because "10.100.0.1" is an IP address in a different subnet), (ii) SDC N's (111N) IP address is "10.200.100.2" (where SDC N may write to (and/or read from) an IP address "10.200.0.1" by considering/targeting that a related SDS (e.g., 116N) resides on that IP address (in fact SDS N (116N) resides on IP address "10.100.0.2", and "10.100.0.2" is meaningless to SDC N (110N) because "10.100.0.2" is an IP address in a different subnet); and/or (iii) without converting SDC related protocol to NVMe/TCP (as performed in the process discussed above in reference to FIG. 1.3), the configurator converts a related IP address, for example, "10.200.0.1" to one or more port numbers (e.g., Port 1001, Port 1002, etc.) via a port multiplexer (151) (where the related IP addresses are exposed to the port multiplexer (151) and then the port multiplexer performs the conversion (in order to multiplex all IP addresses (e.g., "10.200.0.1", "10.200.0.2", etc., see FIG. 1.2) into a single port related IP address "10.200.50.1")), in which, based on a "IP address to port map", (a) the port multiplexer (151) may forward "10.200.0.1" to Port 1001 and "10.200.0.2" to Port 1002, (b) the port multiplexer (151) may forward related traffic (e.g., I/O operations) of VPC A (102A) from Port 1001 and Port 1002 over a private link (137) (via a private link endpoint (PLE) (e.g., 134A)) to a load balancer (138) of Storage Array VPC (104), (c) using its port demultiplexers (e.g., 153, 154, etc.) (where a port demultiplexer converts the port related IP address into one or more SDS IP addresses according to a port number), the load balancer (138) may receive the traffic and send the traffic to a correct IP address of a related SDS (e.g., 116A, 116N, etc.).

Referring to FIG. 1.4 and with respect to VPC B (102B), (i) VPC B (102B) uses (or is associated with) "10.150.0.0/16" consumer-net (which may be defined by a related user on the MDM), (ii) SDC A's (113A) IP address is "10.150.100.1" (where SDC A may write to (and/or read from) an IP address "10.150.0.1" by considering/targeting that a related SDS (e.g., 116A) resides on that IP address (in fact SDS A (116A) resides on IP address "10.100.0.1", and "10.100.0.1" is meaningless to SDC A (113A) because "10.100.0.1" is an IP address in a different subnet), (ii) SDC N's (113N) IP address is "10.150.100.2" (where SDC N may write to (and/or read from) an IP address "10.150.0.1" by considering/targeting that a related SDS (e.g., 116N) resides on that IP address (in fact SDS N (116N) resides on IP address "10.100.0.2", and "10.100.0.2" is meaningless to SDC N (113N) because "10.100.0.2" is an IP address in a different subnet); and/or (iii) without converting SDC related protocol to NVMe/TCP (as performed in the process discussed above in reference to FIG. 1.3), the configurator converts a related IP address, for example, "10.150.0.1" to one or more port numbers (e.g., Port 1004, Port 1005, etc.) via a port multiplexer (152) (where the related IP addresses are exposed to the port multiplexer (152) and then the port multiplexer performs the conversion (in order to multiplex all IP addresses (e.g., "10.150.0.1", "10.150.0.2", etc., see FIG. 1.2) into a single port related IP address "10.150.50.1")), in which, based on a "IP address to port map", (a) the port multiplexer (152) may forward "10.150.0.1" to Port 1004 and "10.150.0.2" to Port 1005, (b) the port multiplexer (152) may forward related traffic (e.g., I/O operations) of VPC B (102B) from Port 1004 and Port 1005 over the private link (137) (via a PLE (e.g., 134B)) to the load balancer (138), (c) using its port demultiplexers (e.g., 153, 154, etc.), the load balancer (138) may receive the traffic and send the traffic to a correct IP address of a related SDS (e.g., 116A, 116N, etc.).

Further, referring to FIG. 1.4, each IP address may be illustrated with a related NIC. For example, IP address "10.100.0.1" may be represented by NIC K (120K) and IP address "10.100.0.2" may be represented by NIC N (120N).

In one or more embodiments, by choosing/implementing the private link plugin—SDC port multiplexing, the configurator may establish one or more data paths (which are agnostic to VPC A's and VPC B's topologies) (i) from VPC A (102A) to Storage Array VPC (104) and (ii) from VPC B (102B) to Storage Array VPC (104) to properly route read/write and MDM calls to the correct entity (e.g., SDS A (116A), SDS N (116N), etc.) in Storage Array VPC (104). As indicated, the private link plugin—SDC port multiplexing enabled communication/networking between, for example, VPC A (102A) and Storage Array VPC (104) may be a unidirectional communication.

One of ordinary skill will appreciate that each of the port multiplexers (e.g., 151, 152, etc.) and each of the port demultiplexers (e.g., 153, 54, etc.) may perform other functionalities without departing from the scope of the embodiments disclosed herein. Each of the port multiplexers (e.g., 151, 152, etc.) and each of the port demultiplexers (e.g., 153, 154, etc.) may be implemented using hardware (e.g., any number of integrated circuits for processing computer readable instructions), software (e.g., a computer program), or any combination thereof.

Turning now to FIG. 1.5, FIG. 1.5 shows an example "cross-VPC" networking established among VPCs using a NAT plugin in accordance with one or more embodiments disclosed herein. As discussed below, in this example, the NAT plugin is a way for the MDM (or more specifically, for the configurator) to set up the cross-VPC networking among VPC A (102A) and VPC B (102B) to Storage Array VPC (104).

Referring to FIG. 1.5 (indicating, at least, how to map VPC A (102A) and VPC B (102B) to Storage Array VPC (104)) and with respect to VPC A (102A), (i) VPC A (102A) uses (or is associated with) "10.200.0.0/16" consumer-net (which may be defined by a related user on the MDM), (ii) SDC A's (111A) IP address is "10.200.100.1" (where SDC A may write to (and/or read from) an IP address (e.g., "10.200.0.1", "10.200.0.2", etc.) by considering/targeting that a related SDS (e.g., 116A) resides on that IP address (in fact SDS A (116A) resides on IP address "10.100.0.1", and "10.100.0.1" is meaningless to SDC A (110A) because "10.100.0.1" is an IP address in a different subnet), (ii) SDC N's (111N) IP address is "10.200.100.2" (where SDC N may write to (and/or read from) an IP address (e.g., "10.200.0.1", "10.200.0.2", etc.) by considering/targeting that a related SDS (e.g., 116N) resides on that IP address (in fact SDS N (116N) resides on IP address "10.100.0.2", and "10.100.0.2" is meaningless to SDC N (110N) because "10.100.0.2" is an IP address in a different subnet); and/or (iii) using one or more routers (and/or switches) and the NAT plugin, and by employing one or more routing rules, the configurator may, for example, route (or translate) "10.200.0.1" to "10.100.0.1" and "10.200.0.2" to "10.100.0.2" so that network/data traffic received from SDC A (111A) will be forwarded to a correct IP address of a related SDS (e.g., 116A, 116N, etc.).

Referring to FIG. 1.5 and with respect to VPC B (102B), (i) VPC B (102B) uses (or is associated with) "10.150.0.0/16" consumer-net (which may be defined by a related user on the MDM), (ii) SDC A's (113A) IP address is "10.150.100.1" (where SDC A may write to (and/or read from) an IP address (e.g., "10.150.0.1", "10.150.0.2", etc.) by considering/targeting that a related SDS (e.g., 116A) resides on that IP address (in fact SDS A (116A) resides on IP address "10.100.0.1", and "10.100.0.1" is meaningless to SDC A (113A) because "10.100.0.1" is an IP address in a different subnet), (ii) SDC N's (113N) IP address is "10.150.100.2" (where SDC N may write to (and/or read from) an IP address (e.g., "10.150.0.1", "10.150.0.2", etc.) by considering/targeting that a related SDS (e.g., 116N) resides on that IP address (in fact SDS N (116N) resides on IP address "10.100.0.2", and "10.100.0.2" is meaningless to SDC N (113N) because "10.100.0.2" is an IP address in a different subnet); and/or (iii) using one or more routers (and/or switches) and the NAT plugin, and by employing one or more routing rules, the configurator may, for example, route (or translate) "10.150.0.1" to "10.100.0.1" and "10.150.0.2" to "10.100.0.2" so that network/data traffic received from SDC A (113A) will be forwarded to a correct IP address of a related SDS (e.g., 116A, 116N, etc.).

Further, referring to FIG. 1.5, each IP address may be illustrated with a related NIC. For example, IP address "10.100.0.1" may be represented by NIC K (120K) and IP address "10.100.0.2" may be represented by NIC N (120N).

In one or more embodiments, by choosing/implementing the NAT plugin, the configurator may establish one or more data paths (which are agnostic to VPC A's and VPC B's topologies) (i) from VPC A (102A) to Storage Array VPC (104) and (ii) from VPC B (102B) to Storage Array VPC (104) to properly route read/write and MDM calls to the correct entity (e.g., SDS A (116A), SDS N (116N), etc.) in Storage Array VPC (104). As indicated, the NAT plugin enabled communication/networking between, for example, VPC A (102A) and Storage Array VPC (104) may be a unidirectional communication.

FIGS. 2.1-2.6 show a method for managing networking among VPCs in accordance with one or more embodiments disclosed herein. While various steps in the method are presented and described sequentially, those skilled in the art will appreciate that some or all of the steps may be executed in different orders, may be combined or omitted, and some or all steps may be executed in parallel without departing from the scope of the embodiments disclosed herein.

Turning now to FIG. 2.1, the method shown in FIG. 2.1 may be executed by, for example, the above-discussed configurator. Other components of the system (100) illustrated in FIG. 1.1 may also execute all or part of the method shown in FIG. 2.1 without departing from the scope of the embodiments disclosed herein.

In Step 200, upon receiving a request from a user (via, for example, a GUI of a related Client Server (e.g., 110A, FIG. 1.1)), the configurator deploys a storage array to a storage array VPC (or an array-net) (e.g., 104, FIG. 1.1), in which each MDM and SDS (hosted in the storage array VPC) is assigned, manually or automatically, an IP address from the array-net. In one or more embodiments, the request may include/specify, at least, user-defined parameters. Details of the user-defined parameters are discussed below in reference to Step 204.

In Step 202, the configurator defines zero or more VPCs (e.g., client VPCs, consumer-nets (indicating a range of IP addresses) (e.g., 102A, 102B, etc., FIG. 1.1), etc.) on the MDM, for example, on top of a local Layer 2 consumer-net. Thereafter, the configurator may define SDS IP addresses (e.g., "10.200.0.1", "10.200.0.2", etc.) in each client VPC (e.g., VPC A (102A), VPC B (102B), etc.). In one or more embodiments, the configurator may define/install/deploy a consumer-net on a newer VPC or on an existing VPC, in which the consumer-net should either already be defined on the MDM, or added to the MDM. Thereafter, the configurator may receive a definition (e.g., a definition for the range of IP addresses) for the newer VPC from the user, along with the associated consumer-net related with the VPC (e.g., a consumer-net related to (or associated with) VPC A (102A)). For example, the user may indicate (to the MDM) to operate/consider (i) VPC A for the IP address range of "10.200.0.0" to "10.200.0.16" and (ii) VPC B for the IP address range of "10.150.0.0 to "10.150.0.16".

In Step 204, by employing a set of linear, non-linear, and/or ML models, the configurator analyzes information (where the user-defined parameters are specified in the information) to determine which cross-VPC networking option (see FIGS. 1.2-1.5) needs to be implemented to map each client VPC to the storage array VPC. In one or more embodiments, the user-defined parameters may include (or specify), for example (but not limited to): cost of implementing a networking option using a related plugin, a number of VPCs that the networking option supports, data latency performance of the networking option, data throughput performance of the networking option, availability of the networking option in the user's geographic location, etc.

In Step 206, the configurator makes a first determination (in real-time or near real-time) as to whether any cross-VPC networking option/solution is already implemented (e.g., in order to enable the communication among the client VPCs and the storage array VPC). Accordingly, in one or more embodiments, if the result of the first determination is NO, the method proceeds to Step 208 of FIG. 2.2. If the result of the first determination is YES, the method alternatively ends.

Turning now to FIG. 2.2, the method shown in FIG. 2.2 may be executed by, for example, the above-discussed configurator. Other components of the system (100) illustrated in FIG. 1.1 may also execute all or part of the method shown in FIG. 2.2 without departing from the scope of the embodiments disclosed herein.

In Step 208, the configurator makes a second determination (in real-time or near real-time) as to whether a first networking option (e.g., an option that implements the multi-VPC ENI plugin, see FIG. 1.2) needs to be implemented. Accordingly, in one or more embodiments, if the result of the second determination is NO, the method proceeds to Step 222 of FIG. 2.3. If the result of the second determination is YES, the method alternatively proceeds to Step 210.

In one or more embodiments, following Step 204 of FIG. 2.1 and before establishing the cross-VPC networking (e.g., generating the client VPCs that will eventually link back to the actual SDSs and MDMs on the storage array VPC), the configurator may perform the second determination by comparing the first networking option to alternatives (e.g., a second networking option (see FIG. 1.3), a third networking option (see FIG. 1.4), a fourth networking option (see FIG. 1.5), etc.) based on each networking option's performance details with respect to the user-defined parameters (e.g., implementing the multi-VPC ENI plugin may be cheaper than implementing the private link plugin—NVMe/TCP in the user's location). To perform the comparing, the configurator may employ, for example, a weightage model. Thereafter, based on the second determination, the configurator may decide to implement the first networking option (as the preferred networking option).

In Step 210, as a result of the second determination in Step 208 being YES, the configurator calls the multi-VPC ENI plugin with a corresponding VPC identifier (ID) (e.g., an ID of VPC A (e.g., 102A, FIG. 1.2)) and a mapping between consumer-net IP addresses (e.g., client VCP IP addresses) and array-net (or storage array VPC) IP addresses (e.g., for VPC A, the mapping between "10.100.0.1" and "10.200.0.1" and the mapping between "10.100.0.2" and "10.200.0.2", see FIG. 1.2).

In Step 212, via one or more inter-VPC networking commands (where the multi-VPC ENI plugin has authorization to call these commands), the configurator identifies the storage array and a target client VPC (e.g., 102A, FIG. 1.2). In Step 214, for each SDS (e.g., 116A, FIG. 1.2) hosted in the storage array VPC, the configurator defines a multi-VPC ENI that is exposed to the target client VPC using related consumer-net IP addresses (so that, for example, an SDC (e.g., 111A, FIG. 1.2) may reach into an SDS using its consumer-net IP address (e.g., "10.200.100.1").

In Step 216, the configurator registers the SDC to the target client VPC to indicate that the SDC belongs to the target client VPC. Thereafter, the SDC may call the MDM to get SDS mappings (e.g., to obtain an SDS mapping specifying that the SDC needs to connect to the SDS to read data from or write data to the storage array). Based on that, the MDM may call the configurator to know which VPC the SDC is associated with and to obtain the associated SDS addresses (which are in the consumer-net associated with the VPC). In one or more embodiments, the selection of the associated consumer-net IP addresses may be performed either by the plugin itself (and returned in a filtered form to the MDM), or filtering logic may be added to the MDM).

When the SDC calls the MDM (or sends data (I/O) to an SDS), the SDC may use the IP addresses defined in its consumer-net. These calls may then be translated and sent to the storage array VPC, to the actual SDSs and MDMs on the storage array VPC.

In Step 218, in response to the request (received in Step 200 of FIG. 2.1) and via a user interface (e.g., the GUI), the configurator initiates notification of the user that cross-VPC networking between the target client VPC and the storage array VPC is established (so that the SDC may read data from or write data to a related SDS using its consumer-net IP address). In one or more embodiments, the method may end following Step 218.

Turning now to FIG. 2.3, the method shown in FIG. 2.3 may be executed by, for example, the above-discussed configurator. Other components of the system (100) illustrated in FIG. 1.1 may also execute all or part of the method shown in FIG. 2.3 without departing from the scope of the embodiments disclosed herein.

In Step 222, as a result of the second determination in Step 208 being NO, the configurator makes a third determination (in real-time or near real-time) as to whether the second networking option (e.g., an option that implements the private link plugin-NVMe/TCP, see FIG. 1.3) needs to be implemented. Accordingly, in one or more embodiments, if the result of the third determination is NO, the method proceeds to Step 236 of FIG. 2.4. If the result of the third determination is YES, the method alternatively proceeds to Step 224.

In general, there may be a limit of several dozen private links an account may have per region. Referring to FIG. 1.1, Storage Array may include hundreds of targets, SDSs. In light of this, instead of using a related SDC protocol (which requires SDC-to-all-SDS private links), the configurator may call the private link plugin—NVMe/TCP (implementing a more conservative protocol NVMe/TCP, which requires just a single target to expose storage volumes of Storage Array). As discussed above in reference to FIG. 1.3, the storage array VPC may implement one or more NVMe/TCP targets (e.g., the SDTs), which accepts NVMe/TCP connections in the front-end (of the storage array VPC) and uses the SDC-to-SDS protocol in the back-end.

Further, on the consumer-net, the configurator may define private link target IP addressed for SDTs. The private link definition may mandate that each such private link may need to point to a load balancer (e.g., 138, FIG. 1.3) inside the storage array VPC that performs load balancing among SDTs exposing the same volumes. In one or more embodiments, to overcome private link bandwidth limitations, the configurator may define multiple private links to point at the same load balancer.

In one or more embodiments, following Step 204 of FIG. 2.1 and before establishing the cross-VPC networking, the configurator may perform the third determination by comparing the second networking option to alternatives based on each networking option's performance details with respect to the user-defined parameters. Thereafter, based on the third determination, the configurator may decide to implement the second networking option (as the preferred networking option).

In Step 224, as a result of the third determination in Step 222 being YES, the configurator calls the private link plugin—NVMe/TCP with a corresponding VPC ID (e.g., an ID of VPC A (e.g., 102A, FIG. 1.3)) and a mapping between consumer-net IP addresses of NVMe/TCP targets and array-net IP addresses of SDTs. In Step 226, via one or more inter-VPC networking commands (where the private link plugin—NVMe/TCP has authorization to call these commands), the configurator identifies the storage array and a target client VPC (e.g., 102A, FIG. 1.3). In Step 228, based on the mapping, the configurator defines (i) the load balancer in the storage array VPC (if does not exist) and (ii) a private link (e.g., 137, FIG. 1.3) from the target client VPC to the load balancer (so that, for example, SDC A (e.g., Client Server A) may reach into an SDS (e.g., 116A, FIG. 1.3) via its consumer-net IP address (which may be turned into a private link target IP address)).

In Step 230, the configurator registers the SDC to the target client VPC to indicate that the SDC belongs to the target client VPC. Thereafter, the SDC may call the MDM to get SDS mappings. Based on that, the MDM may call the configurator to know which VPC the SDC is associated with and to obtain the associated SDS addresses (which are in the consumer-net associated with the VPC). In one or more embodiments, the selection of the associated consumer-net IP addresses may be performed either by the plugin itself (and returned in a filtered form to the MDM), or filtering logic may be added to the MDM).

When the SDC calls the MDM (or sends data (I/O) to an SDS), the SDC may use the IP addresses defined in its consumer-net. These calls may then be translated and sent to the storage array VPC, to the actual SDSs and MDMs on the storage array VPC.

In Step 232, in response to the request (received in Step 200 of FIG. 2.1) and via a user interface (e.g., the GUI), the configurator initiates notification of the user that cross-VPC networking between the target client VPC and the storage array VPC is established (so that the SDC may read data from or write data to a related SDS using its consumer-net IP address over the private link). In one or more embodiments, the method may end following Step 232.

Turning now to FIG. 2.4, the method shown in FIG. 2.4 may be executed by, for example, the above-discussed configurator. Other components of the system (100) illustrated in FIG. 1.1 may also execute all or part of the method shown in FIG. 2.4 without departing from the scope of the embodiments disclosed herein.

In Step 236, as a result of the third determination in Step 222 being NO, the configurator makes a fourth determination (in real-time or near real-time) as to whether the third networking option (e.g., an option that implements the private link plugin—SDC port multiplexing, see FIG. 1.4) needs to be implemented. Accordingly, in one or more embodiments, if the result of the fourth determination is NO, the method proceeds to Step 256 of FIG. 2.6. If the result of the fourth determination is YES, the method alternatively proceeds to Step 238.

In one or more embodiments, in order to use a related SDC protocol, the configurator may assign different ports (e.g., port-multiplexed on the same IP address) for each SDS and MDM in the consumer-net (e.g., 102A, FIG. 1.4). The configurator may then use a single private link to send all data traffic (e.g., I/O operations) back to the storage array VPC, and, in the storage array VPC, may use the load balancer and one or more port demultiplexers (e.g., 153, 154, etc.) to distribute the traffic to their respective SDS (and/or MDM) IP addresses—by a related port number.

In one or more embodiments, following Step 204 of FIG. 2.1 and before establishing the cross-VPC networking, the configurator may perform the fourth determination by comparing the third networking option to alternatives based on each networking option's performance details with respect to the user-defined parameters. Thereafter, based on the fourth determination, the configurator may decide to implement the third networking option (as the preferred networking option).

In Step 238, as a result of the fourth determination in Step 236 being YES, the configurator defines (i) an IP-to-port multiplexer (e.g., 151, FIG. 1.4) in each client VPC (where the multiplexer may expose multiple IP addresses, and redirect all read/write calls to a single target IP address, but different ports) and (ii) one or more port-to-IP demultiplexers (e.g., 153, FIG. 1.4) in the storage array VPC (where a demultiplexer may accept read/write calls on multiple ports, and redirect a related call from each port to a different IP address).

In Step 240, via the private link plugin—SDC port multiplexing, the configurator may assign an IP address to each port-to-IP demultiplexer and, for each SDS in the storage array VPC, define a mapping on all port-to-IP demultiplexers. In one or more embodiments, the number of the demultiplexers may not be related to the number of SDSs in the storage array VPC. Further, the number of demultiplexer listening ports may need to be the same as the number of SDS storage array VPC. In Step 242, the configurator defines, based on the mapping, the load balancer (for the demultiplexers) in the storage array VPC (if does not exist).

In Step 244, the configurator calls the private link plugin—SDC port multiplexing with a corresponding VPC ID (e.g., an ID of VPC A (e.g., 102A, FIG. 1.4)) and a second mapping between consumer-net IP addresses and array-net IP addresses. In Step 246, via one or more inter-VPC networking commands (where the private link plugin—SDC port multiplexing has authorization to call these commands), the configurator identifies the storage array and a target client VPC (e.g., 102A, FIG. 1.4).

In Step 248, based on the second mapping, the configurator defines (i) a third mapping (in the IP-to-port multiplexer of the target client VPC) from a consumer-net IP address of the target client VPC to a related port of its counterpart array-net IP address.

Turning now to FIG. 2.5, the method shown in FIG. 2.5 may be executed by, for example, the above-discussed configurator. Other components of the system (100) illustrated in FIG. 1.1 may also execute all or part of the method shown in FIG. 2.5 without departing from the scope of the embodiments disclosed herein.

In Step 250, based on the third mapping, the configurator defines, a private link (e.g., 137, FIG. 1.4) form the IP-to-port multiplexer of the target client VPC to the load balancer (e.g., 138, FIG. 1.4). In Step 252, the configurator registers an SDC (e.g., 111A, FIG. 1.4) to the target client VPC to indicate that the SDC belongs to the target client VPC. Thereafter, the SDC may call the MDM to get SDS mappings. Based on that, the MDM may call the configurator to know which VPC the SDC is associated with and to obtain the associated SDS addresses (which are in the consumer-net associated with the VPC). In one or more embodiments, the selection of the associated consumer-net IP addresses may be performed either by the plugin itself (and returned in a filtered form to the MDM), or filtering logic may be added to the MDM).

When the SDC calls the MDM (or sends data (I/O) to an SDS), the SDC may use the IP addresses defined in its consumer-net. These calls may then be translated and sent to the storage array VPC, to the actual SDSs and MDMs on the storage array VPC.

In Step 254, in response to the request (received in Step 200 of FIG. 2.1) and via a user interface (e.g., the GUI), the configurator initiates notification of the user that cross-VPC networking between the target client VPC and the storage array VPC is established (so that the SDC may read data from or write data to a related SDS using its consumer-net IP address over the private link). In one or more embodiments, the method may end following Step 254.

Turning now to FIG. 2.6, the method shown in FIG. 2.6 may be executed by, for example, the above-discussed configurator. Other components of the system (100) illustrated in FIG. 1.1 may also execute all or part of the method shown in FIG. 2.6 without departing from the scope of the embodiments disclosed herein.

In Step 256, as a result of the fourth determination in Step 236 being NO, the configurator calls the NAT plugin with a corresponding VPC ID (e.g., an ID of VPC A (e.g., 102A, FIG. 1.5)) and a mapping between consumer-net IP addresses and array-net IP addresses. In Step 258, via Infrastructure as a Service (IaaS) APIs, the configurator identifies the storage array VPC and a target client VPC.

In Step 260, based on the mapping, the configurator defines a router to forward consumer-net IP addresses and array-net IP addresses, in which the router defines NAT/router rules for the forwarding. In one or more embodiments, the router may be employed to pass/transfer traffic between VPCs. As indicated, the router may define one or more routing rules between consumer-net IP addresses and array-net IP addresses, in which NAT to translate the consumer-net IP addresses to array-net IP addresses may be implemented.

In Step 262, the configurator registers an SDC (e.g., 111A, FIG. 1.5) to the target client VPC to indicate that the SDC belongs to the target client VPC. Thereafter, the SDC may call the MDM to get SDS mappings. Based on that, the MDM may call the configurator to know which VPC the SDC is associated with and to obtain the associated SDS addresses (which are in the consumer-net associated with the VPC). In one or more embodiments, the selection of the associated consumer-net IP addresses may be performed either by the plugin itself (and returned in a filtered form to the MDM), or filtering logic may be added to the MDM).

When the SDC calls the MDM (or sends data (I/O) to an SDS), the SDC may use the IP addresses defined in its consumer-net. These calls may then be translated and sent to the storage array VPC, to the actual SDSs and MDMs on the storage array VPC.

In Step 264, in response to the request (received in Step 200 of FIG. 2.1) and via a user interface (e.g., the GUI), the configurator initiates notification of the user that cross-VPC networking between the target client VPC and the storage array VPC is established (so that the SDC may read data from or write data to a related SDS using its consumer-net IP address over/via the router). In one or more embodiments, the method may end following Step 264.

Turning now to FIG. 3, FIG. 3 shows a diagram of a computing device in accordance with one or more embodiments disclosed herein.

In one or more embodiments disclosed herein, the computing device (300) may include one or more computer processors (302), non-persistent storage (304) (e.g., volatile memory, such as RAM, cache memory), persistent storage (306) (e.g., a non-transitory computer readable medium, a hard disk, an optical drive such as a CD drive or a DVD drive, a Flash memory, etc.), a communication interface (312) (e.g., Bluetooth interface, infrared interface, network interface, optical interface, etc.), an input device(s) (310), an output device(s) (308), and numerous other elements (not shown) and functionalities. Each of these components is described below.

In one or more embodiments, the computer processor(s) (302) may be an integrated circuit for processing instructions. For example, the computer processor(s) (302) may be one or more cores or micro-cores of a processor. The computing device (300) may also include one or more input devices (310), such as a touchscreen, keyboard, mouse, microphone, touchpad, electronic pen, or any other type of input device. Further, the communication interface (312) may include an integrated circuit for connecting the computing device (300) to a network (e.g., a LAN, a WAN, Internet, mobile network, etc.) and/or to another device, such as another computing device.

In one or more embodiments, the computing device (300) may include one or more output devices (308), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (302), non-persistent storage (304), and persistent storage (306). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

One or more embodiments disclosed herein may be implemented using instructions executed by one or more processors of a computing device. Further, such instructions may correspond to computer readable instructions that are stored on one or more non-transitory computer readable mediums.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing networking among virtual private clouds (VPCs), the method comprising:

deploying, upon receiving a request from a user, a storage array to a storage array VPC, wherein a metadata manager (MDM) and each storage data server (SDS) hosted within the storage array VPC are assigned an Internet Protocol (IP) address;

defining a set of client VPCs on the MDM;

analyzing information provided within the request to determine which networking option of a plurality of networking options needs to be implemented to map each client VPC of the set of client VPCs to the storage array VPC;

making, after the analyzing, a first determination that none of the plurality of networking options are already implemented;

making, based on the first determination and the information, a second determination that a first networking option of the plurality of networking options needs to be implemented;

calling, based on the second determination, a multi-VPC elastic network interface (ENI) plugin with a corresponding identifier of a target client VPC of the set of client VPCs and a mapping between client VPC IP addresses and storage array VPC IP addresses;

identifying, via an inter-VPC networking command, the storage array VPC and the target client VPC;

defining, for each SDS hosted within the storage array VPC, a multi-VPC ENI that is exposed to the target client VPC using a first client VPC IP address;

registering a storage data client (SDC) to the target client VPC; and initiating, in response to the request and via a user interface, notification of the user that networking between the target client VPC and the storage array VPC is established, wherein, via the networking, the SDC reads data from or writes data to an SDS of the storage array VPC using a second client VPC IP address.

2. The method of claim 1, wherein the SDS is a storage server, wherein, after installing an SDS application on a server, the user converts the server into the storage server.

3. The method of claim 1, wherein the SDC is a consumer server, wherein, after installing an SDC application on a server, the user converts the server into the consumer server, wherein the SDC application is a kernel-level driver.

4. The method of claim 3, wherein the SDC calls the MDM to obtain an SDS mapping specifying that the SDC needs to connect to the SDS to read data from or write data to the storage array, wherein the storage array represents virtual pools of block storage.

5. The method of claim 1, wherein the second determination is performed by comparing the first networking option of the plurality of networking options to a second networking option of the plurality of networking options, a third networking option of the plurality of networking options, and a fourth networking option of the plurality of networking options based on each networking option's performance details with respect to user-defined parameters specified in the information.

6. The method of claim 5, wherein the user-defined parameters specify at least one selected from a group consisting of cost of implementing a particular networking option using a related plugin, a number of VPCs that the particular networking option supports, data latency performance of the particular networking option, data throughput performance of the particular networking option, and availability of the particular networking option in the user's geographic location.

7. The method of claim 1, wherein the storage array VPC executes on a first geographic location, wherein the target client VPC executes on a second geographic location, wherein the first geographic location and the second geographic location are distinct locations.

8. A method for managing networking among virtual private clouds (VPCs), the method comprising:

deploying, upon receiving a request from a user, a storage array to a storage array VPC, wherein a metadata manager (MDM) and each storage data server (SDS) hosted within the storage array VPC are assigned an Internet Protocol (IP) address;

defining a set of client VPCs on the MDM;

analyzing information provided within the request to determine which networking option of a plurality of networking options needs to be implemented to map each client VPC of the set of client VPCs to the storage array VPC;

making, after the analyzing, a first determination that none of the plurality of networking options are already implemented;

making, based on the first determination and the information, a second determination that a first networking option of the plurality of networking options is not available to be implemented;

making, based on the second determination, a third determination that a second networking option of the plurality of networking options needs to be implemented;

calling, based on the third determination, a private link plugin with a corresponding identifier of a target client VPC of the set of client VPCs and a mapping between client VPC IP addresses and storage array VPC IP addresses of storage data targets (SDTs);

identifying, via an inter-VPC networking command, the storage array VPC and the target client VPC;

defining, based on the mapping, a load balancer in the storage array VPC and a private link from the target client VPC to the load balancer;

registering a storage data client (SDC) to the target client VPC; and initiating, in response to the request and via a user interface, notification of the user that networking between the target client VPC and the storage array VPC is established, wherein, via the networking, the SDC reads data from or writes data to an SDS of the storage array VPC using a client VPC IP address over the private link.

9. The method of claim 8, wherein the SDS is a storage server, wherein, after installing an SDS application on a server, the user converts the server into the storage server.

10. The method of claim 8, wherein the SDC is a consumer server, wherein, after installing an SDC application on a server, the user converts the server into the consumer server, wherein the SDC application is a kernel-level driver.

11. The method of claim 10, wherein the SDC calls the MDM to obtain an SDS mapping specifying that the SDC needs to connect to the SDS to read data from or write data to the storage array, wherein the storage array represents virtual pools of block storage.

12. The method of claim 8, wherein the third determination is performed by comparing the second networking option of the plurality of networking options to a third networking option of the plurality of networking options and a fourth networking option of the plurality of networking options based on each networking option's performance details with respect to user-defined parameters specified in the information.

13. The method of claim 12, wherein the user-defined parameters specify at least one selected from a group consisting of cost of implementing a particular networking option using a related plugin, a number of VPCs that the particular networking option supports, data latency performance of the particular networking option, data throughput performance of the particular networking option, and availability of the particular networking option in the user's geographic location.

14. The method of claim 8, wherein the storage array VPC executes on a first geographic location, wherein the target client VPC executes on a second geographic location, wherein the first geographic location and the second geographic location are distinct locations.

15. A method for managing networking among virtual private clouds (VPCs), the method comprising:

deploying, upon receiving a request from a user, a storage array to a storage array VPC, wherein a metadata manager (MDM) and each storage data server (SDS) hosted within the storage array VPC are assigned an Internet Protocol (IP) address;

defining a set of client VPCs on the MDM;

analyzing information provided within the request to determine which networking option of a plurality of networking options needs to be implemented to map each client VPC of the set of client VPCs to the storage array VPC;

making, after the analyzing, a first determination that none of the plurality of networking options are already implemented;

making, based on the first determination and the information, a second determination that a first networking option of the plurality of networking options is not available to be implemented;

making, based on the second determination, a third determination that a second networking option of the plurality of networking options is not available to be implemented;

making, based on the third determination, a fourth determination that a third networking option of the plurality of networking options needs to be implemented;

defining, based on the fourth determination, an IP-to-port multiplexer in each client VPC and a port-to-IP demultiplexer in the storage array VPC;

assigning an IP address to the port-to-IP demultiplexer, wherein, based on the assigning and for each SDS in the storage array VPC, a mapping on the port-to-IP demultiplexer is defined, wherein, based on the mapping, a load balancer is defined in the storage array VPC;

calling, after the assigning, a private link plugin with a corresponding identifier of a target client VPC of the set of client VPCs and a second mapping between client VPC IP addresses and storage array VPC IP addresses;

identifying, via an inter-VPC networking command, the storage array VPC and the target client VPC;

defining, based on the second mapping, a third mapping from a client VPC IP address of the target client VPC to a related port's IP address in the storage array;

defining, based on the third mapping, a private link from an IP-to-port multiplexer of the target client VPC to the load balancer;

registering a storage data client (SDC) to the target client VPC; and initiating, in response to the request and via a user interface, notification of the user that networking between the target client VPC and the storage array VPC is established, wherein, via the networking, the SDC reads data from or writes data to an SDS of the storage array VPC using the client VPC IP address over the private link.

16. The method of claim 15, wherein the SDS is a storage server, wherein, after installing an SDS application on a server, the user converts the server into the storage server.

17. The method of claim 15, wherein the SDC is a consumer server, wherein, after installing an SDC application on a server, the user converts the server into the consumer server, wherein the SDC application is a kernel-level driver.

18. The method of claim 17, wherein the SDC calls the MDM to obtain an SDS mapping specifying that the SDC needs to connect to the SDS to read data from or write data to the storage array, wherein the storage array represents virtual pools of block storage.

19. The method of claim 15, wherein the third determination is performed by comparing the second networking option of the plurality of networking options to the third networking option of the plurality of networking options and a fourth networking option of the plurality of networking options based on each networking option's performance details with respect to user-defined parameters specified in the information.

20. The method of claim 19, wherein the user-defined parameters specify at least one selected from a group consisting of cost of implementing a particular networking option using a related plugin, a number of VPCs that the particular networking option supports, data latency performance of the particular networking option, data throughput performance of the particular networking option, and availability of the particular networking option in the user's geographic location.

* * * * *